United States Patent
O'Brien et al.

(10) Patent No.: US 11,858,667 B1
(45) Date of Patent: Jan. 2, 2024

(54) SATELLITE DISPENSER

(71) Applicant: Amazon Technologies, Inc., Seattle, WA (US)

(72) Inventors: Paul Michael O'Brien, Sammamish, WA (US); Aaron Oliver Carey, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 648 days.

(21) Appl. No.: 16/707,755

(22) Filed: Dec. 9, 2019

Related U.S. Application Data

(60) Provisional application No. 62/916,116, filed on Oct. 16, 2019.

(51) Int. Cl.
*B64G 1/64* (2006.01)

(52) U.S. Cl.
CPC ........ *B64G 1/641* (2013.01); *B64G 2001/643* (2013.01)

(58) Field of Classification Search
CPC .. B64G 1/641; B64G 2001/643; B64G 1/645; B64G 1/1085; B64G 1/10; B64G 2001/1092; B64G 1/1021; F42B 12/60
See application file for complete search history.

(56) References Cited

U.S. PATENT DOCUMENTS

| | | | | | |
|---|---|---|---|---|---|
| 5,961,078 | A | * | 10/1999 | Edberg | F16F 15/02 248/630 |
| 6,138,951 | A | * | 10/2000 | Budris | B64G 1/645 102/393 |
| 10,017,279 | B2 | * | 7/2018 | Poncet | B64G 1/641 |
| 10,486,837 | B2 | * | 11/2019 | Field | B64G 1/641 |
| 11,208,218 | B2 | * | 12/2021 | Lim | B64G 1/641 |
| 2008/0078886 | A1 | * | 4/2008 | Foster | B64G 1/1078 244/173.1 |
| 2009/0108139 | A1 | * | 4/2009 | Duden | B64G 1/002 244/173.3 |
| 2014/0131521 | A1 | * | 5/2014 | Apland | B64G 1/641 244/173.3 |
| 2016/0304222 | A1 | * | 10/2016 | Fernandez | B64G 1/002 |

* cited by examiner

*Primary Examiner* — Medhat Badawi
*Assistant Examiner* — Vicente Rodriguez
(74) *Attorney, Agent, or Firm* — Kilpatrick Townsend & Stockton LLP

(57) ABSTRACT

Systems for satellite dispensing from a second stage of a launch vehicle are described. In an example, a satellite dispenser ring includes a circular ring, a vertical stanchion, and a truss. The vertical stanchion has an interface to couple with an adjacent satellite dispenser ring. The vertical ring is also coupled to a perimeter of the circular ring perpendicular to a place of the circular ring. A satellite attachment interface at an edge of the vertical stanchions couples and releases a satellite.

20 Claims, 17 Drawing Sheets

SATELLITE DISPENSER

CROSS-REFERENCE TO RELATED APPLICATIONS

This application claims priority to and the benefit of U.S. Provisional Patent Application No. 62/916,116, filed Oct. 16, 2019, titled "SATELLITE DISPENSER", the content of which is herein incorporated by reference in its entirety.

BACKGROUND

Satellites can be launched into orbit to provide various functionalities. For example, a communications satellite can create a communications channel between a source device and a destination device at different locations on Earth and can relay and amplify radio telecommunications signals exchanged between the two devices via a transponder of the communications satellite. Of course, other types of satellites can be launched and used, including weather satellite, imaging satellites, and the like. Generally, launch vehicles (e.g., rockets) carry satellites to space. During launch, a satellite is stowed inside a fairing of a launch vehicle. Once in space, the satellite is released from inside the fairing into orbit. Satellites may be placed in low Earth orbit (LEO) or other heights depending on the functionalities that they provide.

BRIEF DESCRIPTION OF THE DRAWINGS

Various embodiments in accordance with the present disclosure will be described with reference to the drawings, in which.

DETAILED DESCRIPTION

Figure 1:
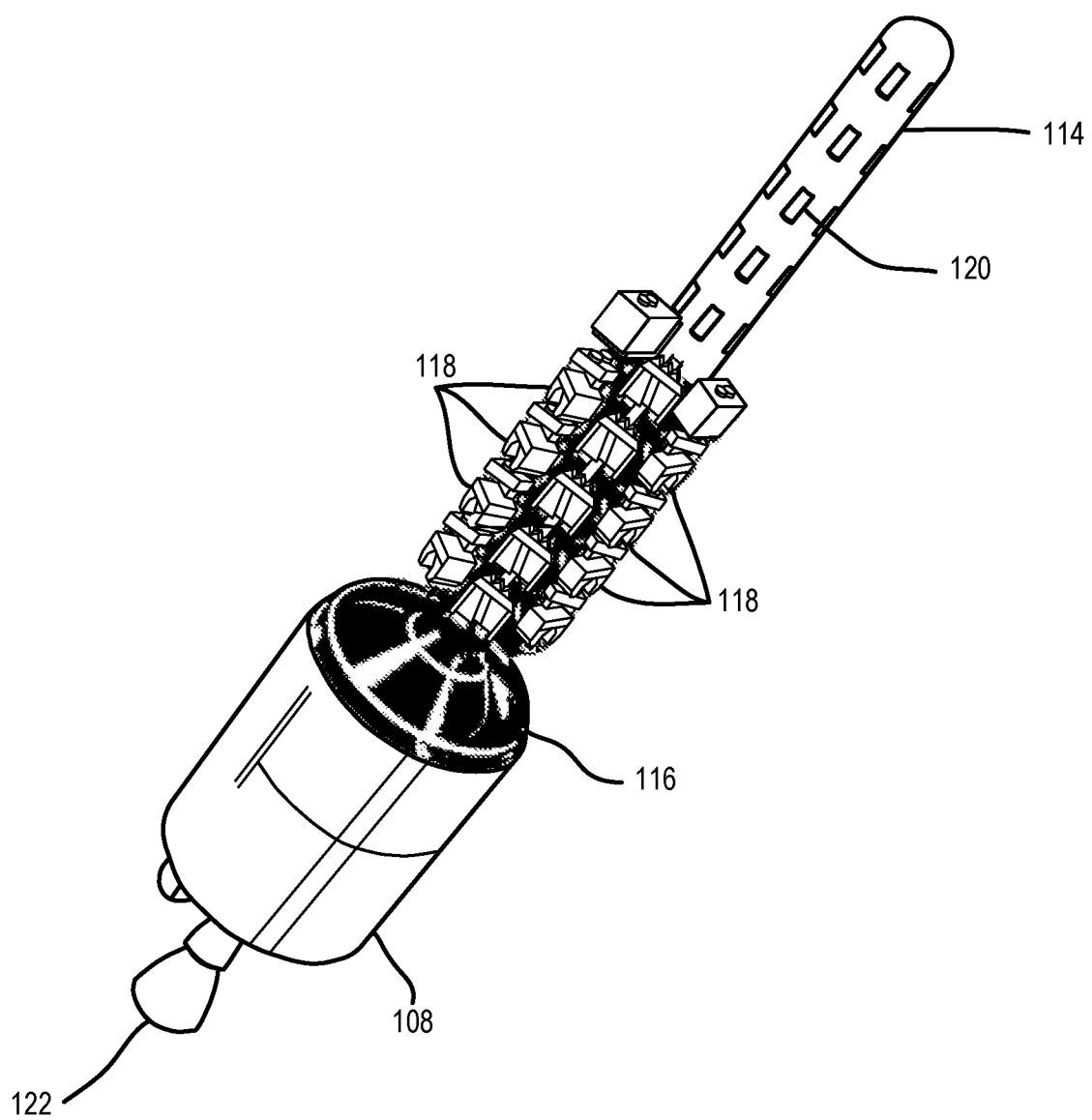
FIG. 1 depicts a second stage of a launch vehicle with a payload fairing removed showing a satellite dispenser with satellites connected thereto, according to at least one example.

Examples are described herein in the context of launch vehicles and satellite placement in orbit. Those of ordinary skill in the art will realize that the following description is illustrative only and is not intended to be in any way limiting. For example, the techniques described herein may be used to launch other materials into space. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Typically, satellites are dispensed from monolithic dispenser towers attached to a second stage of a launch vehicle. The dispenser tower is connected to a second stage of a launch vehicle and enclosed within a clamshell fairing. Upon reaching the desired altitude, the halves of the clamshell fairing release and separate, exposing the dispenser tower for the satellites to be released and dispensed. Such dispenser towers are formed of aluminum forgings or solid-walled carbon fiber tubes. These options are expensive to acquire and time consuming to manufacture and can amount to be a substantially heavy payload.

In comparison, modular dispenser systems described below allow high volume production without compromising performance of the dispenser tower. The modular dispenser systems provide stiffness and strength without introducing additional weight, or otherwise reducing the weight relative to traditional solid-walled carbon fiber dispenser towers, and allow fast and accurate manufacturing for high volumes of launches.

Furthermore, according to embodiments of the present disclosure, a dispenser system is designed to maximize payload volume in a launch vehicle by including multiple concentric rows of satellites. A large capacity launch vehicle can be deployed and includes such a dispenser system.

Embodiments of the present disclosure are directed to, among other things, modular satellite dispensers. In an example, a modular satellite dispenser is connected to a second stage of a launch vehicle and is enclosed within a payload compartment. The modular satellite dispenser is formed by stacking multiple dispenser rings. A dispenser ring includes vertical stanchions providing structure along an axis of the dispenser ring. The vertical stanchions are coupled to one or more inner rings of the dispenser ring. The vertical stanchions also include truss structures extending radially from the vertical stanchions away from the center of the dispenser ring to define a satellite retention area. At the end of the truss structures is an external ring around the outer perimeter of the dispenser ring. The external ring includes satellite attachments where satellites are connected for launch, with portions of the satellites contained in the satellite retention area.

In a particular illustrative example, the modular satellite dispenser includes three or more dispenser rings stacked vertically, with a center axis of each dispenser ring aligned with the others. The dispenser rings connect to one another at the ends of the vertical stanchions for form the modular satellite dispenser. Each dispenser ring has ten satellites connected to the external ring at the outer perimeter of the dispenser ring. The dispenser rings are connected together as described and connected to a payload adapter of a second stage of a launch vehicle. The launch vehicle is launched into space, or to an altitude above the surface of the Earth, and the satellites are released or launched from the modular satellite dispenser.

Embodiments of the present disclosure are also directed to, among other things, a concentric satellite dispenser. In an example, the concentric satellite dispenser has a first dispenser with a second dispenser concentric with and surrounding the first dispenser. The first dispenser fits within a payload compartment of a launch vehicle and couples to a payload adapter to secure to the launch vehicle. The first dispenser defines a number of satellite retention areas around the perimeter of the first dispenser and along the length of the first dispenser. The second dispenser connects to the first dispenser and includes a number of satellite retention areas around the perimeter of the second dispenser. The second dispenser selectively releases from the first dispenser via support struts.

In a particular illustrative example, a concentric satellite dispenser includes a first dispenser that extends the length of a payload compartment of a launch vehicle. The first dispenser has rows of satellites connected at its perimeter in rows, each row having five satellites. The first dispenser includes six rows of satellites. The second dispenser is connected to the first dispenser with selectively releasable struts. The second dispenser has rows of satellites connected at its perimeter, each row having ten satellites. The second dispenser including four rows of satellites. The concentric satellite dispenser is connected to a payload adapter of a second stage of a launch vehicle. The launch vehicle is launched into space, or to an altitude above the surface of the Earth, and the satellites are released or launched from the second dispenser. After the satellites are released from the second dispenser, the second dispenser releases from the first dispenser. After the second dispenser releases, the satellites connected to the first dispenser are released.

In the interest of clarity, embodiments of the present disclosure may be described in connection with non-geosynchronous orbit (NGSO) satellites. Additionally, reference made to low Earth orbit (LEO) is used for description purposes here. However, the embodiments of the present disclosure are not limited as such. Instead, the embodiments similarly apply to the launch of one or more satellites into one or more orbits or to one or more orbital altitudes within an orbit.

FIG. 1 depicts a second stage 108 of a launch vehicle with a fairing removed showing a satellite dispenser 114 with satellites 118 connected thereto. In an example, the second stage 108 includes a propulsion device 122 to provide thrust to the second stage 108. The satellite dispenser 114 is connected to the second stage 108 at a payload adapter 116. The payload adapter 116 may be part of an Evolved Expendable Launch Vehicle (EELV), such as an EELV Secondary Payload Adapter (ESPA). The ESPA may include a ring adapter. The ESPA ring adapter may support a 15,000 pound (6,800 kg) payload with up to six additional payloads of two-hundred pounds (eighty kilograms) each. The ESPA ring uses a metallic ring based on an aluminum cylinder with ports therein. The ports are circular ports around the ring for mounting component on the exterior of the ring.

The payload adapter 116 is attached to a base of the satellite dispenser 114. The satellite dispenser 114 extends from the payload adapter 116 from the payload adapter 116 to the inside end of the fairing and along the center axis of the launch vehicle. By extending the length of the interior volume of the fairing, the satellite dispenser 114 may maximize the total number of the satellites 118 within the payload of the second stage 108. The satellite dispenser 114 has the satellites 118 connected thereto at a number of connection locations 120 along the length and around the perimeter of the satellite dispenser 114. The connection locations include releasable connections to secure the satellites 118 and selectively release or launch them into LEO. The satellites 118 may be released from the satellite dispenser 114 all at the same time or over a period of time.

The satellite dispenser 114 can be a modular satellite dispenser formed of multiple modular rings. Each ring includes a particular number of satellites, or satellite attachment points as further described in FIG. 2. The rings may have the same design and carry the same number of satellites. In some examples the rings may have different designs or carry a varying number of satellites, fewer or more than other rings. In an example, one ring can be made wider or taller than another to accommodate satellites of a different size or shape. In an example, the rings near the top of the payload compartment may have a narrower diameter and carry a lesser number of satellites while still fitting within the payload compartment and optimizing or more efficiently using the space within the payload compartment. In an example, a ring at the base of the satellite dispenser 114 may have a larger diameter to provide additional stability or carry a larger number of satellites, and thereby also move the center of gravity of the payload compartment towards the base of the launch vehicle. Some rings of the satellite dispenser 114 may be included which are narrower or serve as spacers by not having satellites connected to provide area for satellites connected to other rings, such as satellites that are long in at least one direction.

Figure 2:
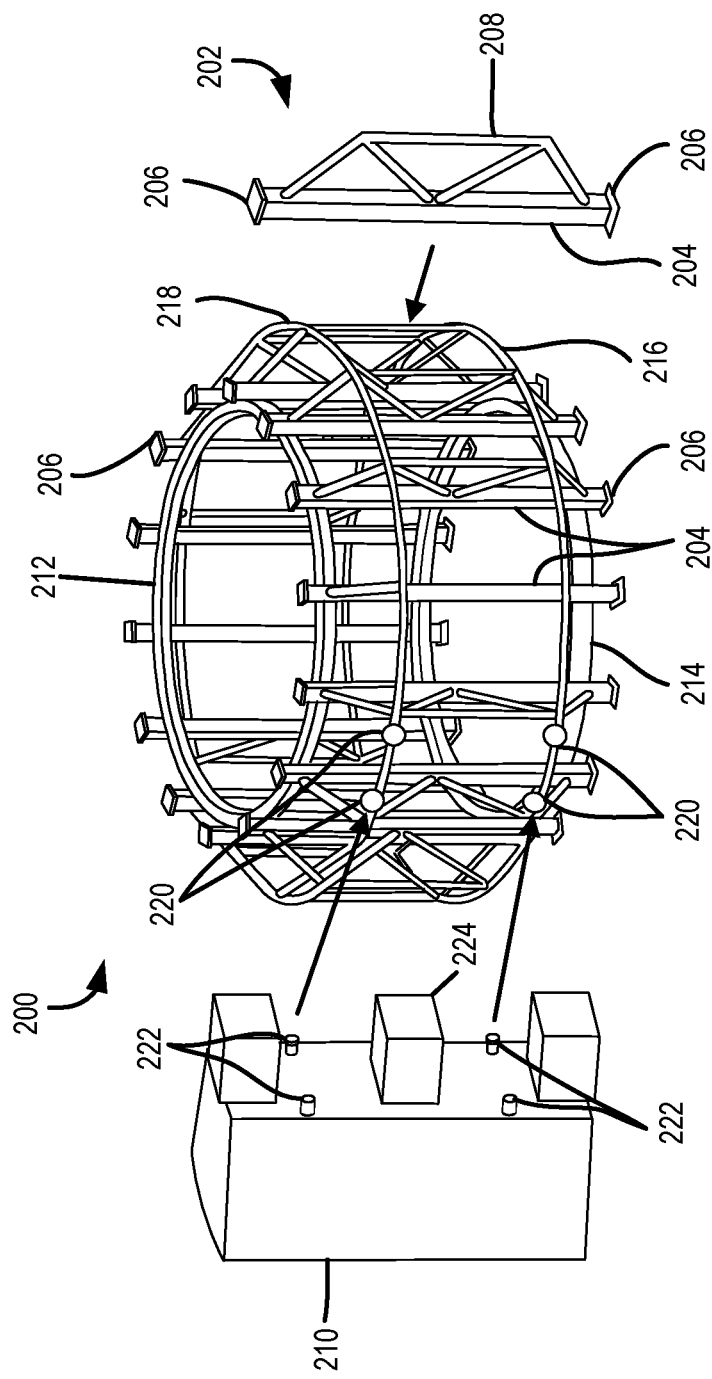
FIG. 2 depicts a dispenser ring of a modular satellite dispenser, according to at least one example.

FIG. 2 depicts a modular dispenser ring 200 of a modular satellite dispenser, such as the satellite dispenser 114 of FIG. 1, according to at least one example. In an example, the modular dispenser ring 200 may have a number of satellites 210 connected around a perimeter of the modular dispenser ring 200. The modular dispenser ring 200 may be combined with other modular dispenser rings 200 to form the modular satellite dispenser.

In an example, the modular dispenser ring 200 includes a first inner circular ring 212 and a second inner circular ring 214 defining the inner perimeter of the modular dispenser ring 200. In some examples there may be a third inner circular ring or additional inner circular rings as well as only the first inner circular ring to define the inner perimeter.

Additional inner circular rings may provide additional strength or stiffness to the modular dispenser ring 200. Each of the first inner circular ring 212 and the second inner circular ring 214 has a height that is only a fraction of the height of the modular dispenser ring 200. In an example, the height (e.g., cross-section) of each of the first inner circular ring 212 and the second inner circular ring 214 may only be five percent or less of the height of the modular dispenser ring 200. In an example, the first inner circular ring 212 and the second inner circular ring 214 have a diameter in a range of ten to one hundred centimeters. The first inner circular ring 212 and the second inner circular ring 214 define a central volume through which a central axis of the second stage 108 passes. In other words, the center portion of the modular dispenser ring 200 may align concentrically with the second stage 108.

The first inner circular ring 212 and the second inner circular ring 214 are connected by a number of vertical stanchions 204. The vertical stanchions have a length in a range of fifty to four hundred centimeters and have a cross section of only a few to ten centimeters across. The vertical stanchions 204 extend perpendicular to the first inner circular ring 212 and the second inner circular ring 214. The vertical stanchions 204 are also parallel to a central axis of the modular dispenser ring 200. In some examples, the vertical stanchions 204 may be at an angle relative to the central axis. For example, the vertical stanchions 204 may be at an angle of ten degrees relative to the central axis. The vertical stanchions 204 may be support beams or structures such as "I" beams, tubular supports, solid supports, or other such support structures. The vertical stanchions can be hollow or solid and can be made out of a rigid material, such as steel, aluminum, carbon fiber, magnesium, titanium, or other such materials.

At each end of the vertical stanchions 204, securing devices 206 are connected to the vertical stanchions 204. A securing device 206 may be used to secure a first modular dispenser ring 200 to a second modular dispenser ring 200 to form a satellite dispenser, such as satellite dispenser 114. The securing device 206 may be a plate defining holes therein, through which bolts may extend to a secure securing devices 206 of an adjacent modular dispenser ring 200. In some examples, the securing device 206 may include a release mechanism, such as a hold down and release mechanism that releasably secures the securing devices 206 together and selectively releases the connection between the securing devices 206. The securing device 206 may also include a permanent connection, such as the securing device 206 being welded to or otherwise permanently affixed to an adjacent securing device 206.

In some examples, the securing device 206 may include an adapter ring which connects to the ends of multiple vertical stanchions. The adapter ring may also include a securing mechanism to securely affix the adapter ring of a first modular dispenser ring to an adapter ring of a second modular dispenser ring. The adapter ring may allow the first modular dispenser ring and the second modular dispenser ring to be rotated at angle with respect to one another when secured. This may be advantageous in situations where satellites are staggered along the height of the satellite dispenser to accommodate larger satellites or satellites having a unique shape while still packing as tightly as possible around the satellite dispenser.

Extending radially from the modular dispenser ring 200 and connected to the vertical stanchions 204 are truss structures 208. The truss structures 208 extend out and increase the external diameter of the modular dispenser ring 200. The larger external diameter of the modular dispenser ring 200 allows for a greater number of satellites 210 to be connected to the modular dispenser ring 200 and increases the capacity of the satellite dispenser. The truss structures 208 also define areas, in between adjacent truss structures 208, which may receive satellites 210 or portions of satellites 210 such as a satellite component to protect a portion of the satellite 210 during launch. Such areas are referred to herein as retention areas to connote the capability of retaining at least portions of satellites. All together, the vertical stanchion 204, truss structure 208, and securing devices 206 form a vertical support member 202.

The truss structures 208 include a number of components or trusses in a truss arrangement. For example, a truss structure 208 may be a planar truss with all elements of the truss laying in a two-dimensional plane to preserve as much area as possible in the area described above between truss structures for satellites to rest in. In some examples, the truss structures 208 may be in a three-dimensional structure, with supports for the upper beam extending from two different locations on each of a first external ring 216 and a second external ring 218. This may be beneficial for larger satellites or satellites 210 having greater weight to provide support and prevent collision with adjacent satellites 210 during launch of the launch vehicle. Such a structure may include a space frame truss comprised of tetrahedrons or other similar three-dimensional shapes.

Although FIG. 2 shows each of the truss structures 208 as a Warren truss with equilateral triangles formed by the struts of the truss structure 208, other truss configurations may be suitable or used in place of the Warren truss. Some examples include a Pratt truss, a K truss, a Howe truss, a king truss, and a queen truss. Additional strut configurations may be used which provide support at the side of a truss structure 208 opposite a vertical stanchion 204.

At a distal end of the truss structures 208, around the external diameter of the modular dispenser ring 200, the truss structures 208 connect to and support the first external ring 216 and the second external ring 218. The first external ring 216 and the second external ring 218 define the external diameter of the modular dispenser ring 200. The first external ring 216 and the second external ring 218 may be rings formed of a solid material, a tube material, a flanged material, or other such cross-section that may increase the strength of the first external ring 216 and the second external ring 218. The first external ring 216 and the second external ring 218 may have the same or a similar design as the first internal circular ring 212 and the second internal circular ring 214 except for, for instance, having a larger diameter. The first external ring 216 and the second external ring 218 may be formed of the same materials, or a different material than the internal rings. In an example, the first internal circular ring 212 is formed of aluminum while the first external ring 216 is formed of carbon fiber. Additionally, though two external rings are shown, in some examples there may be only one external ring or there may be three or more external rings.

The first external ring 216 and the second external ring 218 each include satellite attachment interfaces 220. The satellite attachment interfaces 220 may include a coupleable interface or a releasably coupleable interface. The satellites 210 connect, releasably, to the satellite attachment interfaces 220 with satellite connections 222. The satellite attachment interfaces 220 selectively secure and release satellites 210 to dispense when at the proper altitude during launch. The satellite attachment interface 220 may include release and launch devices, such as pin-pullers, spring loaded connections, or other similar devices may be used to release and launch the satellites. In an example, a hold and release mechanism used as the satellite attachment interface 220 may be an electromechanical device include a preloaded launch device such as a spring and a wire or fuse wire that is broken by an electrical current from a signal to launch, allowing the preloaded launch device to actuate.

Although the external rings 216 and 218 and internal rings 212 and 214 of the modular dispenser rings 200 are shown having similar shapes, the external rings may be formed of a different material or having a different shape. For example, the external rings 216 and 218 may be rectangular or polygonal, such as hexagonal, octagonal, or any other n-sided polygon while the internal rings are circular. A polygonal external ring may provide straight edges to couple satellites 210 to rather than a curved edge of a circular ring. The internal rings 212 and 214 may likewise be polygonal in some examples.

When connected to the modular dispenser ring 200, the satellites 210 may have portions that extend inwardly towards the center of the modular dispenser ring 200 through the open structure defined by the first inner circular ring 212, the second inner circular ring 214, the vertical stanchions 204, the truss structures 208, the first external ring 216, and the second external ring 218. The portions of the satellite 210 extending in towards the center of the modular dispenser ring 200 may include satellite components or other such devices that may be protected during launch to prevent damage. Furthermore, prior to launch and while on the ground, the open nature of the modular dispenser ring 200 allows for easy checkout of the satellites 210 to ensure they are undamaged after transporting them to a launch location without removing the satellites 210 as required by some previous systems which is both time consuming and difficult.

The modular dispenser ring 200 may be formed of a metal, such as aluminum, that provides favorable mechanical characteristics, such as strength and rigidity, while still remaining lightweight and allowing for the minimal, open structure, to function as desired. In some examples, the modular dispenser ring 200, or the components thereof may be formed of other metals such as steel, stainless steel, magnesium, titanium, or other metals or alloys. The first inner circular ring 212, the second inner circular ring 214, the vertical stanchions 204, the securing devices 206, the truss structure 208, the first external ring 216, the second external ring 218, and the satellite attachment interfaces 220 reduce the weight of the satellite dispenser over previous systems which included solid walls extending the full height of the satellite dispenser 114. In some examples, the eight of the satellite dispenser may not be reduced, though properties such as stiffness and rigidity may be improved. Additionally, the metallic design of the modular dispenser ring 200 allows for rapid manufacturing using common techniques, such as welding, bolting, riveting, bending, notching, punching, and simple machining operations. This increases the repeatability and speed of manufacturing of the modular dispenser rings 200, thereby reducing costs associated with manufacturing the satellite dispenser 114. This significantly simplifies the manufacturing process over typical carbon-fiber or other such designs. Some examples may include hybrid mixtures of metal components and carbon-fiber components, for example with truss structures formed of aluminum and rings formed of carbon-fiber and joined together with connections such as bolts.

In some examples, the modular dispenser ring 200 may be formed of non-metallic materials such as carbon-fiber. The strut and truss design of the modular dispenser ring 200 may allow the elements of the modular dispenser ring 200 to be formed individually, for example by forming the vertical stanchions 204 of carbon fiber before joining them to the first inner circular ring 212 and the second inner circular ring 214. This may reduce the weight of the satellite dispenser 114 while still providing the favorable manufacturing benefits described above.

The modular design of the modular dispenser ring 200 used to form the satellite dispenser 114 allows for multiple ring segments to be produced simultaneously, even by disparate manufacturers, and assembled all at once at the launch location into the satellite dispenser 114. This simplifies the manufacturing process further and simplifies the logistics of transporting the satellite dispenser from a manufacturing location to a launch site. The modular design is easily scaled to fit a particular number of satellites within the payload of a particular launch vehicle, or to maximize the diameter (and thereby the number of satellites) within a fairing of a large diameter. Additionally, the modular design of the modular dispenser ring 200 means that additional modular dispenser rings 200 can quickly and easily be added to increase the height of the satellite dispenser 114 within the fairing, and ensures that the satellite dispenser 114 fits in fairings of multiple different launch vehicles.

When connected to the dispenser ring 200, the satellites 210 may have portions 224 that extend inwardly towards the center of the dispenser ring 200 through an interface plane defined by two adjacent vertical stanchions 204. There may be a plurality of interface planes around the perimeter of the satellite dispenser 200. One of the interface planes may, for example, be defined an inner plane by the open structure between the first inner circular ring 212, the second inner circular ring 214, the vertical stanchions 204, and the truss structures 208. This inner plane may allow for portions of the satellite 210 to extend or protrude inwardly towards the center of the dispenser ring 200 into an inner volume of the dispenser ring 200. In comparison, the distal end of the truss structures 208 may define an outer plane through which a portion of satellite 210 protrudes towards the interior of the dispenser ring 200. In some examples, the outer plane may have the satellite protrude through while the interface plane is located towards the center of the dispenser ring 200 relative to the outer plane and is not pierced or having a portion of the satellite 210 extending through it. The inner volume of the dispenser ring may provide a space for an installer or inspector to inspect the internal portions of satellite 210 or the connection to the dispenser ring 200. The portions of the satellite extending in towards the center of the dispenser ring 200 may include one or more satellite components that may be protected during launch to prevent damage. Furthermore, prior to launch and while on the ground, the open nature of the dispenser ring 200 allows for easy checkout of the satellites to ensure they are undamaged after transporting them to a launch location without removing the satellites as required by some previous systems which is both time consuming and difficult.

Figure 3:
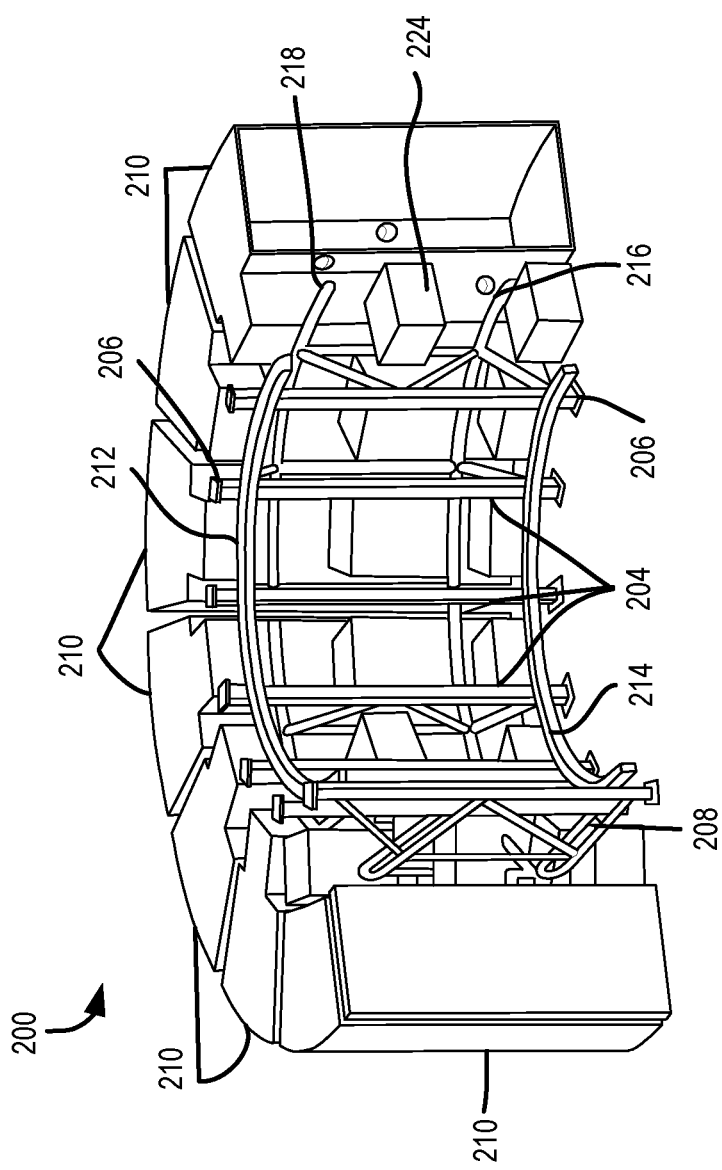
FIG. 3 depicts a cross section of the dispenser ring of FIG. 2 with satellites installed thereon, according to at least one example.

FIG. 3 depicts a cross section of the dispenser ring of FIG. 2 with satellites 210 installed thereon, according to at least one example. The satellites 210 are shown connected to the satellite attachment interfaces 220 of FIG. 2. In an example as shown, the satellites 210 abut one another to pack as tightly as possible around the modular dispenser ring 200. In an example, the satellites 210 may be spaced apart by around one centimeter or several centimeters. In another example, the satellites 210 may be spaced by less than five percent of the width of the satellite 210. A satellite component 224 is shown extending in towards the center of the modular dispenser ring 200, located nearer to the center of the modular dispenser ring 200 than the first external ring 216 and the second external ring 218. In this example, the satellite component 224 is protected from bumping or colliding with other components during launch of the launch vehicle as vibrations and movement may occur within the second stage of the launch vehicle. Additionally, the satellite component 224 is on an internal side of the satellite 210 such that when the satellite 210 is released from the satellite attachment interface 220 and dispensed at the proper altitude the satellite component is protected from collisions with potential space debris. In particular, the satellites 210 propel radially away from the modular dispenser ring 200 during dispensing of the satellites 210. As the satellites 210 move outwardly, the outward facing side may include shielding and also provides a shield for the more fragile components such as the satellite component 224 from being on the front side of a potential collision.

The satellites 210 include portions that extend inwardly from the outer plane as defined by the external rings 216 and 218 as well as the distal end of the truss structure 208. The inner plane, as defined by the inner rings 212 and 214 and the vertical stanchions 204, does not have a portion of the satellite 210 protruding through it to keep the inner volume of the dispenser ring 200 clear for inspection or other purposes such as storage of further devices or equipment. In some examples, the portion of the satellite 210 may protrude through to the inner volume of the dispenser ring 200 while still keeping at least a portion of the inner volume clear for inspection.

Figure 4:
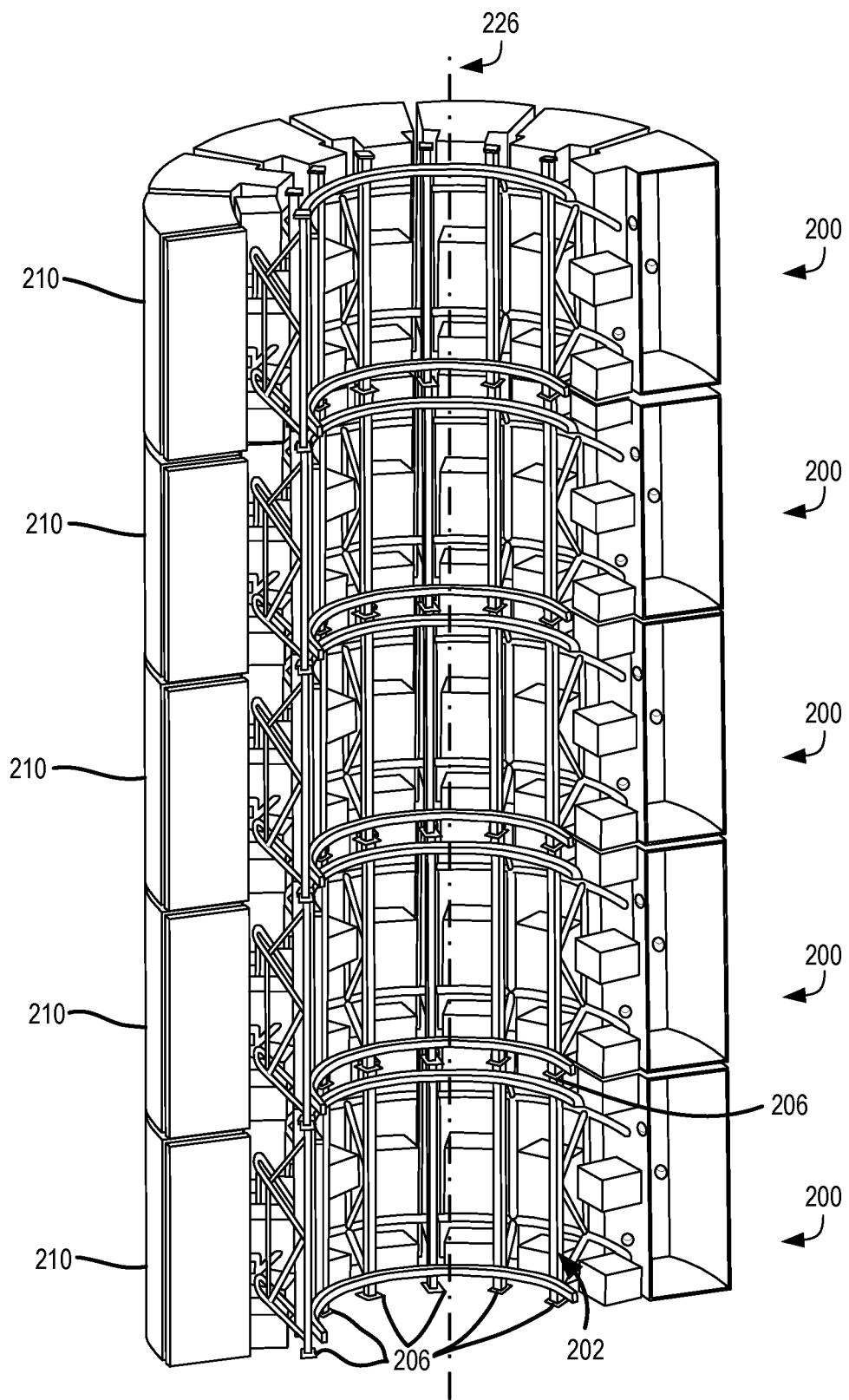
FIG. 4 depicts a cross section of a satellite dispenser formed from a number of modular dispenser rings of FIG. 2 having satellites installed thereon, according to at least one example.

FIG. 4 depicts a cross section of a satellite dispenser formed from a number of modular dispenser rings 200 of FIG. 2 having satellites 210 installed thereon, according to at least one example. The modular dispenser rings 200 are coupled together at the securing device 206. The securing device 206 serve to orient the modular dispenser rings 200 such that they are concentric around a central axis 226. The central axis 226 is also a central axis of the launch vehicle when the modular dispenser rings are coupled to a payload adapter of the launch vehicle.

As described above, securing devices 206 may permanently or releasably secure the modular dispenser rings 200 together. For example, the modular dispenser rings 200 may be permanently assembled by welding the securing devices 206 together or may be releasably secured as described above with respect to FIG. 2.

FIG. 4 shows a modular satellite dispenser, an example of the satellite dispenser 114, including five modular dispenser rings 200. In some examples the satellite dispenser may include a different number of modular dispenser rings 200. For instance, the satellite dispenser 114 may include up to ten or greater than ten modular dispenser rings 200. The size of the satellite dispenser 114 may be determined based on the payload compartment of a launch vehicle. For instance, some launch vehicles may have a longer payload compartment that is suited to a longer satellite dispenser 114 to more efficiently use the payload compartment and deliver a greater number of satellites 210 to LEO.

Figure 5:
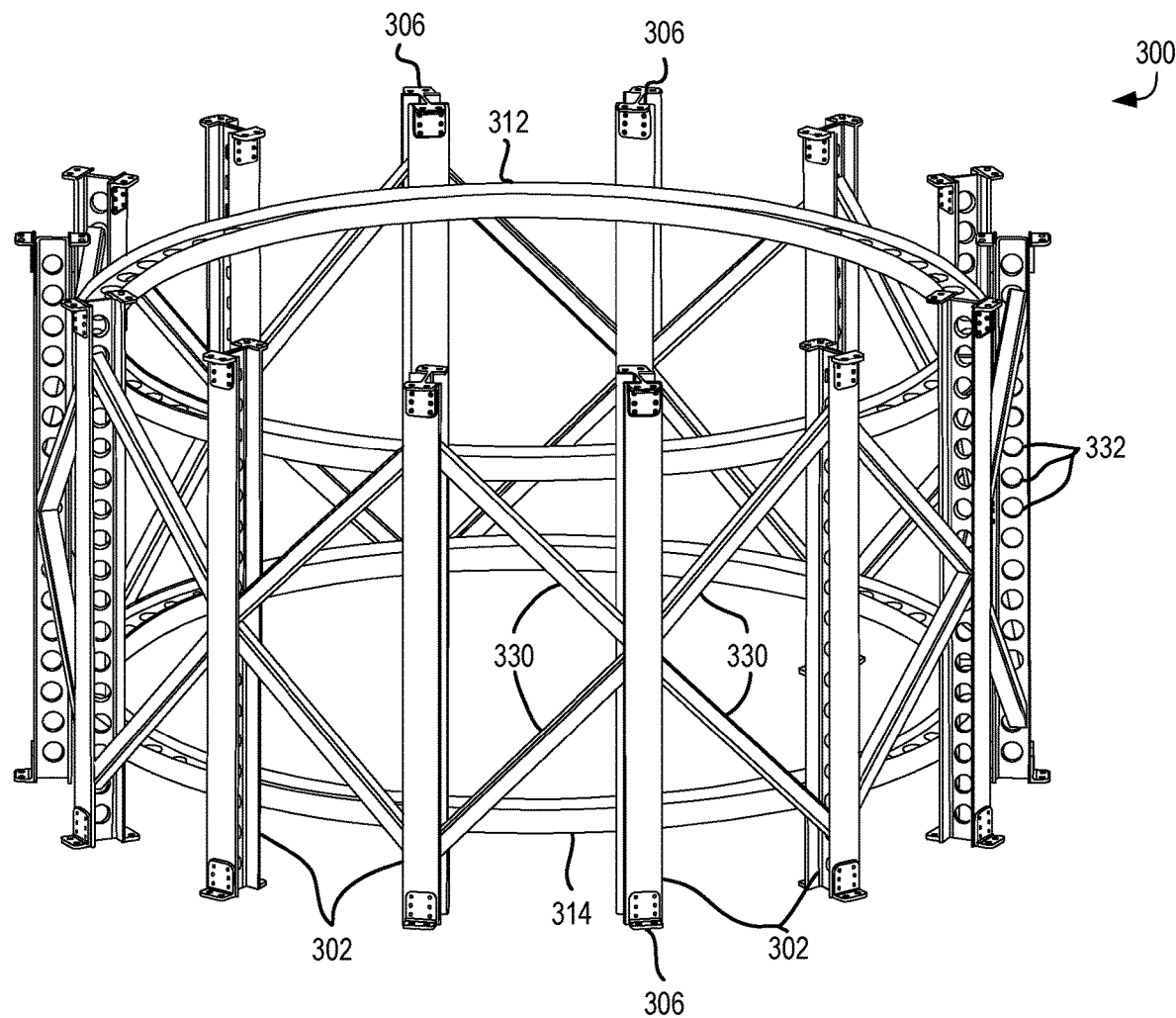
FIG. 5 depicts another dispenser ring of a modular satellite dispenser, according to at least one example.

FIG. 5 depicts a dispenser ring 300 of a modular satellite dispenser similar to the dispenser ring 200 described above with respect to FIG. 3. In an example, the dispenser ring 300 may be configured to retain a number of satellites connected around a perimeter of the dispenser ring 300 similar to the modular dispenser ring 200 of FIG. 4. The dispenser ring 300 may be combined with other dispenser rings 300 to form the modular satellite dispenser as further described in FIG. 6.

In an example, the dispenser ring 300 includes a first inner circular ring 312 and a second inner circular ring 314 defining the inner perimeter of the dispenser ring 300. In some examples there may be a third inner circular ring or a different number of inner circular rings to define the inner perimeter. Additional inner circular rings may provide additional strength or stiffness to the dispenser ring 300. Each of the first inner circular ring 312 and the second inner circular ring 314 has a height that is only a fraction of the height of the dispenser ring 300. In an example, the height (e.g., cross-section) of each of the first inner circular ring 312 and the second inner circular ring 314 may only be five percent or less of the height of the dispenser ring 300. In an example, the first inner circular ring 312 and the second inner circular ring 314 have a diameter in a range of ten to one hundred centimeters. The first inner circular ring 312 and the second inner circular ring 314 define a central volume through which a central axis of the second stage 108 passes. In other words, the center portion of the dispenser ring 300 may align concentrically with the second stage 108.

The first inner circular ring 312 and the second inner circular ring 314 are connected by a number of vertical stanchions 302. The vertical stanchions 302 have a length in a range of fifty to two hundred centimeters and have a cross section of only a few to ten centimeters across. The vertical stanchions 302 extend perpendicular to the first inner circular ring 312 and the second inner circular ring 314. The vertical stanchions 302 are also parallel to a central axis of the dispenser ring 300. The vertical stanchions 302 may be support beams or structures such as "I" beams, tubular supports, solid supports, or other such support structures. The vertical stanchions 302 can be hollow or solid and can be made out of a rigid material, such as steel, aluminum, carbon fiber, magnesium, titanium, or other such materials. As shown, the vertical stanchions 302 include a plurality of voids or holes 332 which reduce the weight of the vertical stanchions 302 without significantly impacting the strength of the vertical stanchions 302.

At each end of the vertical stanchions 302, securing devices 306 are connected to the vertical stanchions 302. A securing device 306 may be used to secure a first dispenser ring 300 to a second dispenser ring 300 to form a satellite dispenser 400, such as satellite dispenser 114. The securing device 306 may be a plate defining holes therein, through which bolts may extend to a secure securing devices 306 of an adjacent dispenser ring 300. In some examples, the securing device 306 may include a release mechanism, such as a hold down and release mechanism that releasably secures the securing devices 306 together and selectively releases the connection between the securing devices 306. The securing device 306 may also include a permanent connection, such as the securing device 306 being welded to or otherwise permanently affixed to an adjacent securing device 306.

In some examples, the securing device 306 may include an adapter ring which connects to the ends of multiple vertical stanchions 302. The adapter ring may also include a securing mechanism to securely affix the adapter ring of a first dispenser ring to an adapter ring of a second dispenser ring. The adapter ring may allow the first dispenser ring and the second modular ring to be rotated at angle with respect to one another when secured. This may be advantageous in situations where satellites are staggered along the height of the satellite dispenser to accommodate larger satellites or satellites having a unique shape while still packing as tightly as possible around the satellite dispenser.

Between adjacent vertical stanchions 302 are struts 330 that connect the vertical stanchions and provide strength and rigidity to the dispenser ring 300 as well as the satellite dispenser when assembled. The struts 330 are shown as an acute angle, specifically at an angle of forty-five degrees with respect to the vertical stanchions 302, though other angles greater or smaller than forty-five degrees may be used. The struts 330 form triangular structures that provide structural integrity to the dispenser ring 300. The struts 330 may form crossbeams that intersect the vertical stanchions 304 at a particular angle. For example, the angle may be forty-five degrees, sixty degrees, seventy-five degrees, thirty degrees, or any other suitable angle with respect to the vertical stanchions 304.

The vertical stanchions 302 define the external diameter of the dispenser ring 300. The vertical stanchions 302 include satellite attachment interfaces. The satellites connect, releasably, to the satellite attachment interfaces. The satellites may rest, be connected to, or retained in a retention area. The retention area can be defined by two adjacent vertical stanchions 302, the first inner circular ring 312, and the second inner circular ring 314. If the struts 330 are used, the retention area can also be defined by the struts 330. The satellite attachment interfaces selectively secure and release satellites to dispense when at the proper altitude during launch. The satellite attachment interface may include release and launch devices, such as pin-pullers, spring loaded connections, or other similar devices may be used to release and launch the satellites. In an example, a hold and release mechanism used as the satellite attachment interface may be an electromechanical device include a preloaded launch device such as a spring and a wire or fuse wire that is broken by an electrical current from a signal to launch, allowing the preloaded launch device to actuate.

When connected to the dispenser ring 300, the satellites may have portions that extend inwardly towards the center of the dispenser ring 300 through an interface plane defined by two adjacent vertical stanchions 302. The interface plane may define the plane on which the satellite attachment interfaces are connected. The open structure defined by the first inner circular ring 312, the second inner circular ring 314, the vertical stanchions 302, and the struts 330 may allow for portions of satellites to extend or protrude inwardly through the interface plane towards the center of the dispenser ring 300. The portions of the satellite extending in towards the center of the dispenser ring 300 may include satellite components or other such devices that may be protected during launch to prevent damage. Furthermore, prior to launch and while on the ground, the open nature of the dispenser ring 300 allows for easy checkout of the satellites to ensure they are undamaged after transporting them to a launch location without removing the satellites as required by some previous systems which is both time consuming and difficult. The interface plane, as well as adjacent interface planes around the perimeter of the dispenser ring 300 define an inner volume of the dispenser ring 300. During installation of the satellites, personnel can access the inner volume to easily secure and check the installation of satellites. Portions of the satellites can extend into the inner volume, for example a satellite component of a satellite may protrude into the inner volume as described above.

The dispenser ring 300 may be formed of a metal, such as aluminum, that provides favorable mechanical characteristics, such as strength and rigidity, while still remaining lightweight due to either material properties or due to the truss-like structure and allowing for the minimal, open structure, to function as desired. In some examples, the dispenser ring 300, or the components thereof may be formed of other metals such as steel, stainless steel, magnesium, titanium, or other metals or alloys. The first inner circular ring 312, the second inner circular ring 314, the vertical stanchions 302, the securing devices 306, the struts 330, and the satellite attachment interfaces may, but not necessarily, reduce the weight of the satellite dispenser over previous systems which included solid walls extending the full height of the satellite dispenser 114. Additionally, the metallic design of the dispenser ring 300 allows for rapid manufacturing using common techniques, such as welding, bolting, riveting, bending, notching, punching, and simple machining operations. This increases the repeatability and speed of manufacturing of the modular dispenser rings 300, thereby reducing costs associated with manufacturing the satellite dispenser 114. This significantly simplifies the manufacturing process over typical carbon-fiber or other such designs. Some examples may include hybrid mixtures of metal components and carbon-fiber components, for example with truss structures formed of aluminum and rings formed of carbon-fiber and joined together with connections such as bolts.

In some examples, the dispenser ring 300 may be formed of non-metallic materials such as carbon-fiber. The strut and truss design of the dispenser ring 300 may allow the elements of the dispenser ring 300 to be formed individually, for example by forming the vertical stanchions 302 of carbon fiber before joining them to the first inner circular ring 312 and the second inner circular ring 314. This may reduce the weight of the satellite dispenser 114 while still providing the favorable manufacturing benefits described above.

The modular design of the dispenser ring 300 used to form the satellite dispenser 114 allows for multiple ring segments to be produced simultaneously, even by disparate manufacturers, and assembled all at once at the launch location into the satellite dispenser 114. This simplifies the manufacturing process further and simplifies the logistics of transporting the satellite dispenser from a manufacturing location to a launch site. The modular design is easily scaled to fit a particular number of satellites within the payload of a particular launch vehicle, or to maximize the diameter (and thereby the number of satellites) within a fairing of a large diameter. Additionally, the modular design of the dispenser ring 300 means that additional modular dispenser rings 300 can quickly and easily be added to increase the height of the satellite dispenser 114 within the fairing, and ensures that the satellite dispenser 114 fits in fairings of multiple different launch vehicles.

Figure 6:
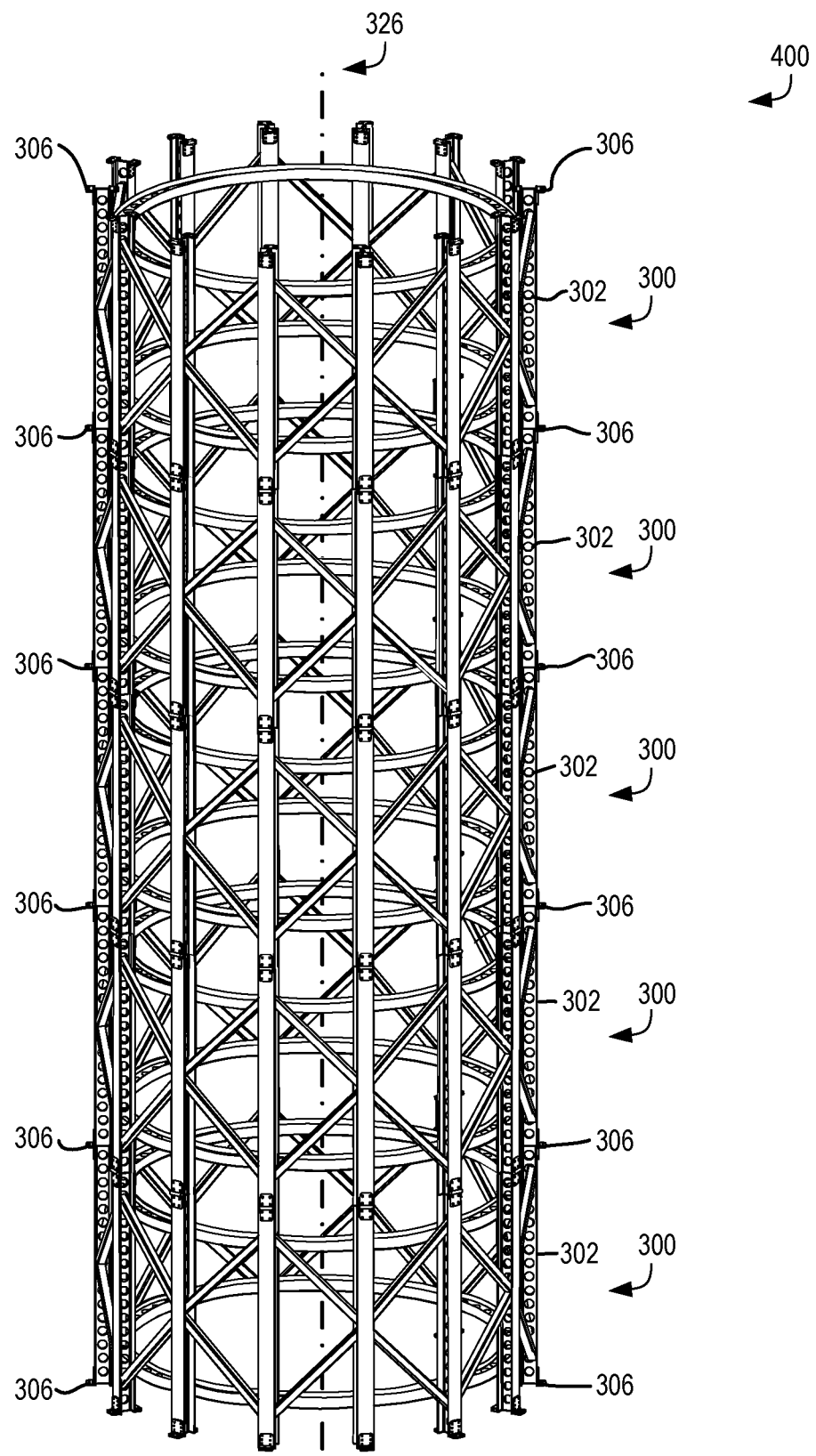
FIG. 6 depicts a satellite dispenser formed from a number of modular dispenser rings of FIG. 5, according to at least one example.

FIG. 6 depicts a satellite dispenser 400 formed from a number of modular dispenser rings of FIG. 5. The dispenser rings 300 are coupled together at the securing device 306. The securing device 306 serves to orient the dispenser rings 300 such that they are concentric around a central axis 326. The central axis 326 is also a central axis of the launch vehicle when the modular dispenser rings are coupled to a payload adapter of the launch vehicle.

As described above, securing devices 306 may permanently or releasably secure the dispenser rings 300 together. For example, the dispenser rings 300 may be permanently assembled by welding the securing devices 306 together or may be releasably secured as described above with respect to FIG. 2.

FIG. 6 shows a satellite dispenser 400, an example of the satellite dispenser 114, including five dispenser rings 300. In some examples the satellite dispenser may include a different number of dispenser rings 300. For instance, the satellite dispenser 114 may include up to ten or greater than ten dispenser rings 300. The size of the satellite dispenser 114 may be determined based on the payload compartment of a launch vehicle. For instance, some launch vehicles may have a longer payload compartment that is suited to a longer satellite dispenser 114 to more efficiently use the payload compartment and deliver a greater number of satellites to LEO. For instance, the dispenser rings 300 may have a diameter of less than one meter, between one and two meters, or greater than 2 meters.

The struts 330 provide additional rigidity and structural integrity to the satellite dispenser 400. The struts 330 provide strength to the structure by acting as trusses to help resist racking, twisting, or deformation in the structure of the satellite dispenser 400. Additional struts may be added at or near the base of the satellite dispenser 400, such as greater numbers or diameters of struts in the dispenser rings 300 at the base of the satellite dispenser 400 as compared to the dispenser rings 300 near the top of the satellite dispenser 400.

The dispenser rings 300 may be formed of different materials and have different configurations in a single satellite dispenser 400. For example, the diameter of the dispenser rings 300 may be variable over the height of the satellite dispenser 400, with dispenser rings 300 at the base of the satellite dispenser 400 having a greater diameter than dispenser rings 300 at the middle or top of the satellite dispenser 400. Additionally, the dispenser rings 300 may be formed of different materials in a single satellite dispenser 400. For instance, the dispenser rings 300 at the base may be formed of steel and the dispenser rings 300 at the top of the satellite dispenser may be formed of lighter carbon fiber. In another illustration, the dispenser rings 300 at the base may be formed of carbon fiber and the dispenser rings 300 at the top of the satellite dispenser may be formed of aluminum. The height of the dispenser rings 300 may likewise be variable, with dispenser rings 300 of varying heights combined together to accommodate satellites of differing sizes and shapes.

Figure 7:
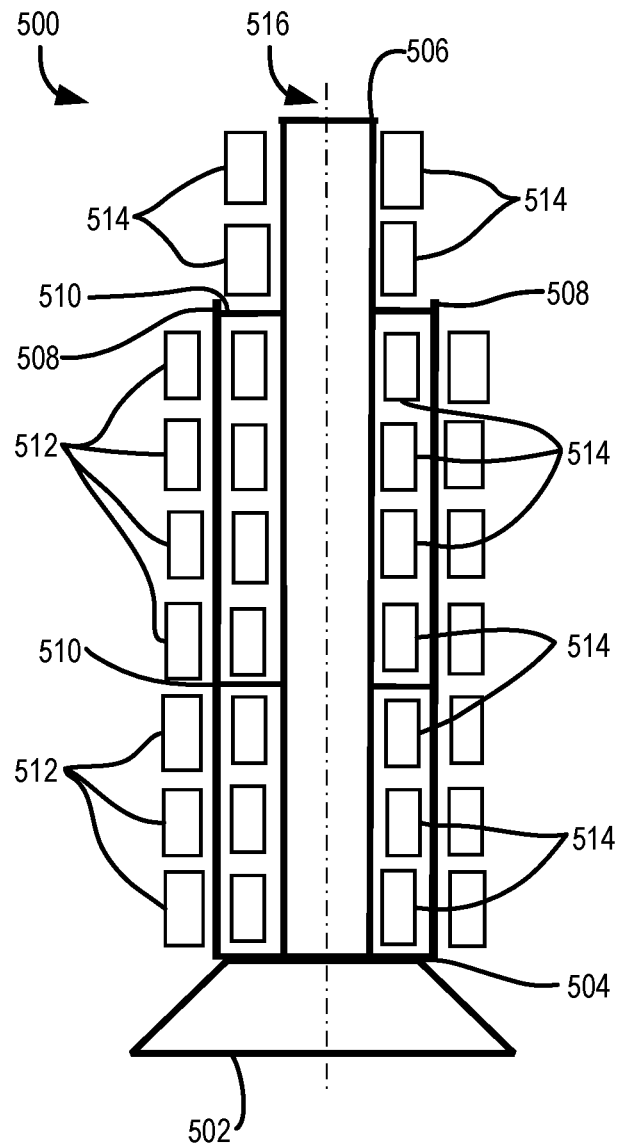
FIG. 7 depicts a cross section of a satellite dispenser connected to a payload adapter of a launch vehicle having an inner and an outer dispenser with satellites installed thereon, according to at least one example.

FIG. 7 depicts a cross section of a concentric satellite dispenser 500 connected to a payload adapter 504 of a second stage 502 of a launch vehicle having an inner dispenser 506 and an outer dispenser 508 with first satellites 512 and second satellites 514 installed thereon, according to at least one example. The concentric satellite dispenser 500 may include a structure similar to the modular dispenser ring 200 described above for the inner dispenser 506 and/or the outer dispenser 508. The inner dispenser 506 may be taller or longer than the outer dispenser 508 to reflect the shape of a payload compartment of a launch vehicle, that includes a cone or pointed shape tapering away from the tip of the launch vehicle to a larger diameter along the length of the launch vehicle.

The inner dispenser 506 is concentric with a central axis 516 of the payload compartment of the second stage 502. The inner dispenser 506 may be a satellite dispenser such as described above with respect to FIGS. 2 through 4. In particular, the inner dispenser 506 may be formed of modular dispenser rings 200 into a satellite dispenser, such as the modular dispenser ring 200 described with respect to FIG. 2. In particular, at least one of such modular dispenser rings 200 includes a first inner circular ring and a second inner circular ring defining the inner perimeter of the modular dispenser ring. The first inner circular ring and the second inner circular ring each has a height that is only a fraction of the height of the modular dispenser ring. The first inner circular ring and the second inner circular ring define a central volume through which the central axis 516.

In an example the first inner circular ring and the second inner circular ring are each connected by a number of vertical stanchions. The vertical stanchions extend perpendicular to the first inner circular ring and the second inner circular ring. The vertical stanchions are also parallel to the central axis 516.

At each end of the vertical stanchions, securing devices are connected to the vertical stanchions. The securing device may be used to secure a first modular dispenser ring to a second modular dispenser ring to form the inner dispenser 506.

Extending radially from the modular dispenser ring and connected to the vertical stanchions are truss structures. The truss structures extend out and increase the external diameter of the modular dispenser ring. The larger external diameter of the modular dispenser ring allows for a greater number of second satellites 514 to be connected to the modular dispenser ring and increases the capacity of the inner dispenser 506. The inner dispenser 506 may also be scaled to a smaller diameter to more tightly pack the second satellites 514 near the center of the payload compartment around the central axis 516. This allows the outer dispenser 508 to surround the inner dispenser 506 and the second satellites 514 to increase the satellite capacity of the concentric satellite dispenser 500.

At a distal end of the truss structures, around the external diameter of the modular dispenser ring, the truss structures connect to and support a first external ring and a second external ring. The first external ring and the second external ring define the external diameter of the modular dispenser ring.

The first external ring and the second external ring each include satellite attachment interfaces. The second satellites 516 connect, releasably, to the satellite attachment interfaces. The satellite attachment interfaces selectively secure and release satellites to dispense when at the proper altitude during launch.

The inner dispenser 506 may be formed of a metal, such as aluminum, that provides favorable mechanical characteristics, such as strength and rigidity, while still remaining lightweight and allowing for the minimal, open structure, to function as desired. In some examples, the inner dispenser 506, or the components thereof may be formed of other metals such as steel, stainless steel, magnesium, titanium, or other metals or alloys. Additionally, the metallic design of the inner dispenser 506 allows for rapid manufacturing using common techniques, such as welding, bolting, riveting, bending, notching, punching, and simple machining operations. This increases the repeatability and speed of manufacturing of the inner dispenser 506, thereby reducing costs associated with manufacturing the concentric satellite dispenser 500. This significantly simplifies the manufacturing process over typical carbon-fiber or other such designs. The inner dispenser 506 may be too narrow or rigid to support and protect satellites as well as withstand the intensity of launch and may, therefore, rely on the connection through the struts 510 to the outer dispenser 508 to provide additional strength and rigidity to the inner dispenser during launch. For example, the inner dispenser 506 may be tall and very narrow and susceptible to buckling or large vibrations during launch. The outer dispenser 508 has a greater diameter and therefore is more stable and resistant to buckling than the inner dispenser 506. The struts 510 connecting the inner dispenser 506 and the outer dispenser 508 provide strength and rigidity along the height of the inner dispenser 506. There may be additional struts 510 not shown which connect the inner dispenser 506 and the outer dispenser 508 along the height of the inner dispenser 506.

In some examples, the inner dispenser 506 may be formed of non-metallic materials such as carbon-fiber. This may reduce the weight of the inner dispenser 506 and also the concentric satellite dispenser 500 while still providing the favorable manufacturing benefits described above and increasing the satellite capacity within the payload compartment.

The configuration described above is an example of the inner dispenser 506 including modular dispenser rings. The embodiments of the present description are not limited to modular dispenser rings and as such can apply to other configurations of an inner dispenser. For example, the inner dispenser may not be modular but may instead be one integral, monolithic piece.

In an example, the outer dispenser 508 surrounds the inner dispenser 506 as well as the second satellites 514. The outer dispenser 508 may have a similar structure to the inner dispenser 506 as described above, including the modular dispenser rings 200. In some examples, the inner dispenser 506 and the outer dispenser 508 may not be made of modular dispenser rings 200 but may be formed of aluminum, carbon fiber, or other equivalent materials and formed into towers to which the first satellites 512 and the second satellites 514 are attached. The outer dispenser 508 is connected to the inner dispenser 506 with struts 510 that extend radially from the inner dispenser 506 to the inside of the outer dispenser 508 to secure the inner dispenser 506 and the outer dispenser 508 together. The struts 510 include releasable connections for disconnecting the outer dispenser 508 from the inner dispenser 506 to uncover the second satellites 514 during release of the payload.

In some examples, the inner dispenser 506 and the outer dispenser 508 may be some combination of modular and monolithic structures. For example, as described above, the inner dispenser 506 may be formed of modular dispenser rings. The outer dispenser 508 may likewise be formed of modular dispenser rings, specifically, as modular dispenser rings that come apart into two or more segments as described below.

In an example, the inner dispenser 506 may be formed of module dispenser rings as described above while the outer dispenser 508 is formed of a clamshell structure or other similar monolithic structure formed as a single component. In another example, both the inner dispenser 506 and the outer dispenser 508 may be formed of monolithic on non-modular structures, such as a carbon fiber shell or other such structure.

The outer dispenser 508 may separate into two or more sections for releasing from the inner dispenser 506. The outer dispenser 508 may be formed into two sections, each section extending the length of the outer dispenser 508 and including half of the diameter of the outer dispenser 508. For example, the outer dispenser 508 may divide into two sections, each section having a C-shape extending the length of the outer dispenser 508. In an example, the outer dispenser 508 is symmetrical about a middle plane of the outer dispenser. Other variations may exist, for example the top portion or the bottom portion may not include a horizontal structure. In an example, the bottom portion of the outer dispenser 508 may have a larger diameter to more evenly distribute the load of the satellites. The top or upper portion may have a lock and release mechanism while the lower section remains tethered to the launch vehicle. In examples with greater numbers of sections than two, the C-shape may be less than half of a circular cross-section. When the outer dispenser 508 is connected to the inner dispenser 506, the struts 510 may secure the sections of the outer dispenser 508. In some examples, the sections of the outer dispenser 508 may also releasably secure together.

Multiple struts 510 may be used at varying heights and at different positions around the perimeter of the inner dispenser 506. For example, the struts 510 may connect the outer dispenser 508 to the inner dispenser 506 at the top end of the outer dispenser 508 as well as at a height halfway or some other intermediate height along the outer dispenser 508. There may also be a strut 510 at the base of the outer dispenser 508 that connects the outer dispenser 508 to the second stage 502 rather than to the inner dispenser 506. In some examples, rather than a strut, at the base of the outer dispenser 508, a hinge may connect the pieces of the outer dispenser 508 to the launch vehicle and allow the outer dispenser 508 to pivot around the hinge out of the path of the satellites 514 connected to the inner dispenser.

In an example, the outer dispenser 508 may include the struts 510 that couple the inner dispenser 506 and the outer dispenser 508 together. The struts 510 may be permanently affixed to the outer dispenser 508 but releasably secured to the inner dispenser 506, such as with a hold and release mechanism as described herein. In another example, the inner dispenser 506 may have the struts 510 permanently coupled while the releasable end of the strut 510 couples to the outer dispenser 508.

The struts 510 may be distributed along the height of the inner dispenser 506 and vary in size, location, and number. For example, at the base of the inner dispenser there may be a first number (e.g. three or four) of struts 510 around the circumference of the inner dispenser of a first thickness. At the top of the outer dispenser 510 there may be a second number (e.g., six or more) struts 510 larger than the first number to support and provide strength to the inner dispenser 506. There may be a number (e.g., one, two, three, or even more) of rows of struts 510 along the height of the inner dispenser 506. The struts may have a certain thickness, such as less than one inch at the base and a greater thickness, such as greater than one inch at or near the top of the outer dispenser 508.

The outer dispenser 508 may come apart into more than two pieces, such as into quarters or eighths to move away from the inner dispenser 506 after the satellites 512 are released. Fewer pieces forming the outer dispenser 508 can result in greater strength and stiffness. In comparison, outer dispenser 508 formed of more than two pieces can have less stiffness, but each piece is relatively easier to remove and displace away from the inner dispenser 506 upon release.

In another example, the outer dispenser 508 may be a single component that translates vertically along the inner dispenser 506 after the satellites 512 are released to clear the path of the satellites 514. The outer dispenser may be pushed off by a thrust device and moved away after releasing, or may simply translate with respect to the inner dispenser while still connected. In another example, the outer dispenser 508 may be collapsible. For instance, the outer dispenser 508 may be formed of a series of rings of thin-walled shells that overlap at a flange or periphery to form the outer dispenser 508 but collapse to a height of a single ring, with each of the successive rings collapsed concentric with and either inside of out outside of an adjacent ring.

The sections of the outer dispenser 508 may be tethered to the second stage 502 or to the inner dispenser 506 with a cable, cord, lock and release mechanism, or other tethering mechanism to retain the outer dispenser 508 after releasing from the inner dispenser 506 as described above. The tether (not shown) serves to keep the released sections of the outer dispenser 508 together with the inner dispenser 506 and the second stage 502. This helps prevent the outer dispenser 508 becoming a potential obstacle in LEO and can also result in reuse of the outer dispenser for subsequent launches if recovered.

The connections to the struts 510 and the connections between sections of the outer dispenser 508 to each other are releasable to allow the outer dispenser 508 to separate from the inner dispenser 506 and clear a path for release of the second satellites 514 after the first satellites 512 are released to LEO. The releasable connections may include hold and release mechanisms or other selectively releasable connections.

Although the example described above includes a single outer dispenser 508, other examples may include a third dispenser concentric with and outside of the outer dispenser 508. Further, additional outer dispensers may be added, so long as the diameter of the resulting dispenser and satellites fits within a payload compartment of a launch vehicle.

FIGS. 8 through 12 illustrate a concentric satellite dispenser 500 in various stages of deployment for dispensing satellites to LEO, according to at least one example. Specifically, FIGS. 8 through 12 include five stages of dispensing of satellites from a concentric satellite dispenser 500. The first satellites 512 are arranged in a first set of rings on the outer perimeter of the outer dispenser 508, with the second satellites 514 arranged concentric to and inside the first satellites 512 and the outer dispenser 508. In this configuration, the first satellites 512 are released or dispersed first, then the outer dispenser 508 is released, following the outer dispenser 508 the second satellites 514 are released. This configuration provides for a greater utilization of the payload area of the launch vehicle and increases the number of satellites that may be launched with a single launch vehicle. Additionally, the concentric rings of satellites at the base of the concentric satellite dispenser 500 shifts the center of gravity of the launch vehicle and of the second stage 108 nearer to the base of the launch vehicle, providing benefits such as stability and reducing the energy required to steer the second stage 108 of the launch vehicle.

Figure 8:
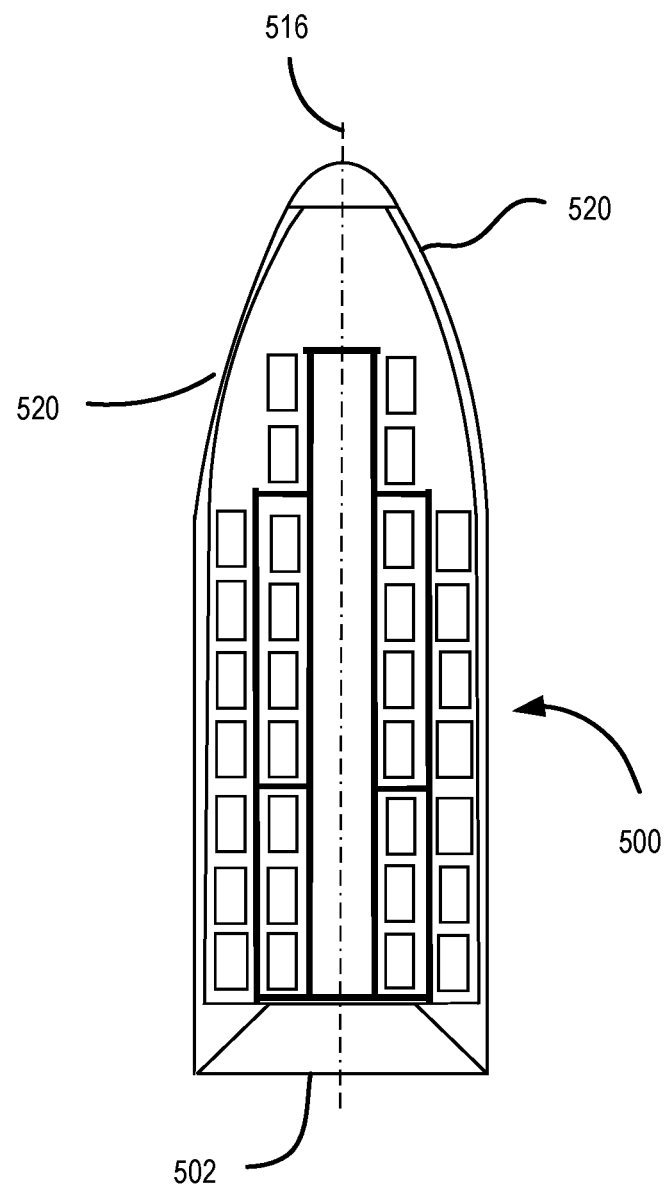
FIG. 8 depicts a cross section of the satellite dispenser of FIG. 5 enclosed within a fairing of the launch vehicle, according to at least one example.

In FIG. 8, the payload of a second stage 502 is shown enclosed within a fairing 520. The views shown in FIGS. 8 through 12 include a cross-sectional view similar to the view of FIG. 7. Concentric with the central axis 516 is a concentric satellite dispenser 500, as described above with respect to FIG. 7. The concentric satellite dispenser 500 extends a partial length of the payload compartment. In some examples, the concentric satellite dispenser 500 may extend the full length of the payload compartment to maximize the number of satellites launched. The concentric satellite dispenser 500 is surrounded by satellites, in stacked rings along the height of the concentric satellite dispenser 500. The satellites are arranged and releasably secured as described above to permit dispensing of the satellites at the proper stage of launch. Surrounding the inner dispenser 506 and the second satellites 514 arranged around it is an outer dispenser 508. The outer dispenser 508 is connected to the inner dispenser 506 and may be connected to the second stage 502 at or near the base of the payload portion. The outer dispenser 508 is also connected to the inner dispenser 506, to provide stiffness, rigidity, and support to the outer dispenser 508. This helps prevent large displacement of the inner dispenser 506 and the outer dispenser 508 during launch and so provides stability and rigidity to prevent damage to the satellites during launch. The outer dispenser 508 does not extend the full length of the inner dispenser 506 or the full length of the payload compartment, due to the bullet-like shape of the payload compartment. Around the external perimeter of the outer dispenser are the first satellites, also arranged in stacked rings, concentric with the inner dispenser 506 and the outer dispenser 508 as well as the second satellites 514.

In an example, the fairing 520 may define an internal payload compartment having a height of five meters. The inner dispenser 506 may include five modular dispenser rings, each modular dispenser ring one meter in height. Each ring of the inner dispenser 506 may have ten satellites secured to a perimeter thereof. The outer dispenser 508 may include four modular dispenser rings of a greater diameter than the inner dispenser 506, having a height of one meter each. Each ring of the outer dispenser 508 may include fifteen satellites secured around the perimeter. The fifty satellites coupled to the inner dispenser 506 and the sixty satellites coupled to the outer dispenser 508 are launched into LEO. When released, the one hundred and ten satellites become part of a satellite constellation providing communications services between points on the Earth, such as internet services.

Figure 9:
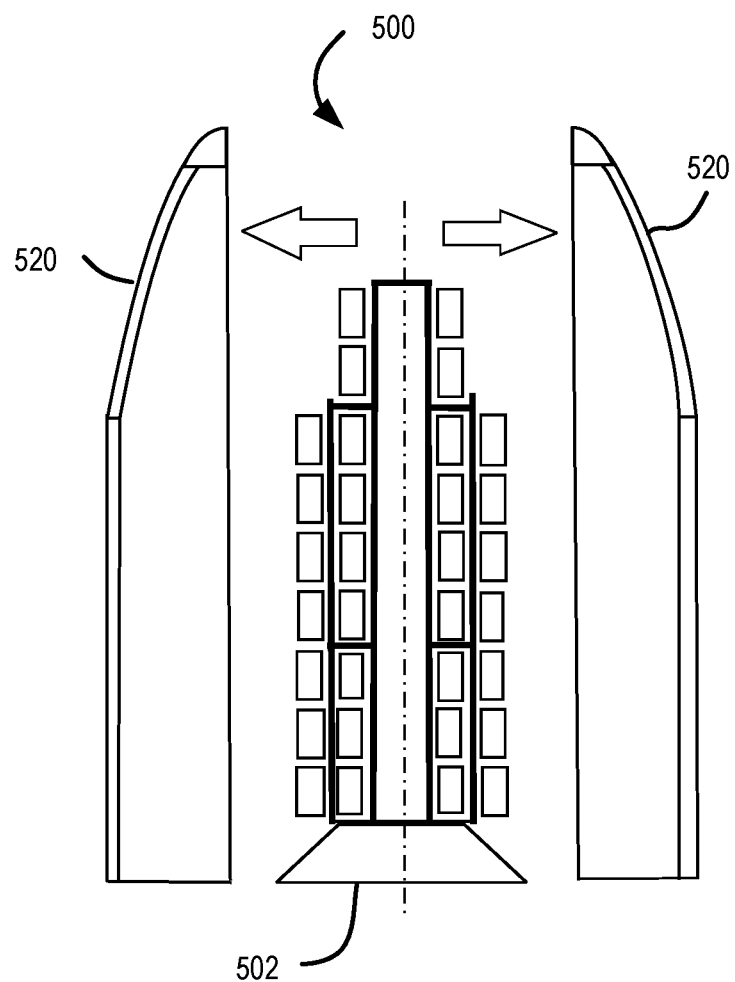
FIG. 9 depicts the satellite dispenser of FIG. 6 after the fairing of the launch vehicle releases to expose the satellite dispenser to the exterior of the launch vehicle, according to at least one example.
Figure 15:
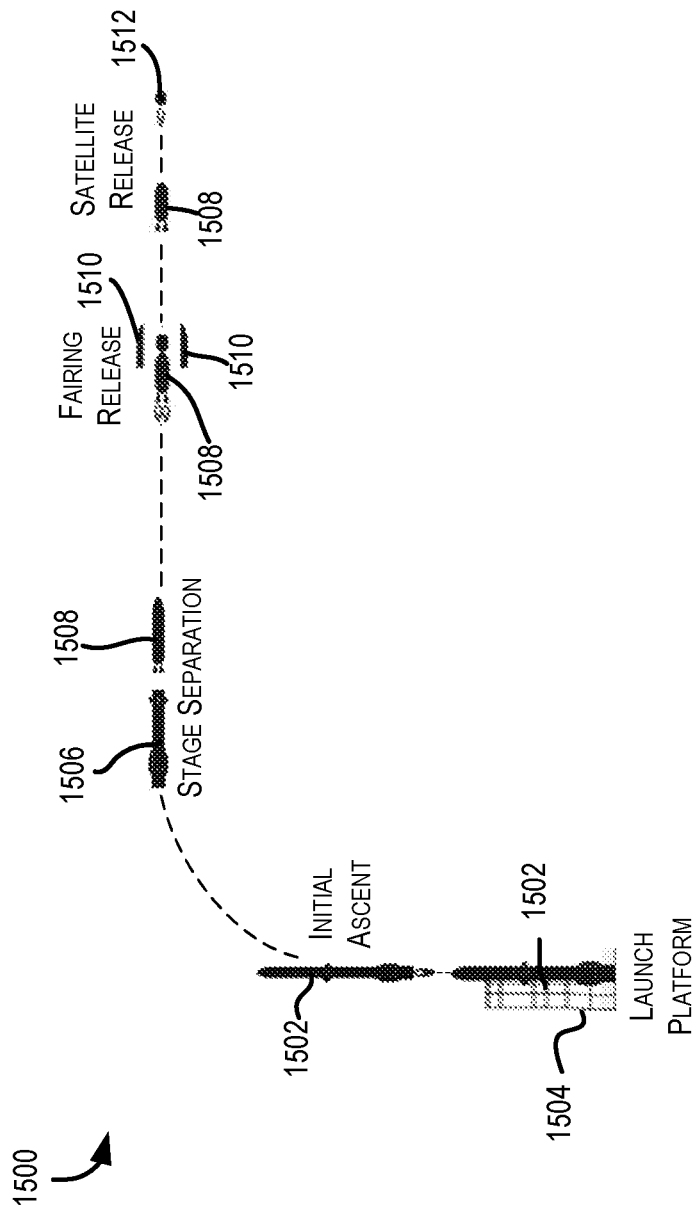
FIG. 15 depicts a launch sequence for satellites into orbit, according to at least one example.

The fairing 520 covering the payload compartment is releasable from the second stage 502 as depicted in FIGS. 9 and 15. The fairing 520 opens or releases from the second stage 502 in a clamshell configuration. In the clamshell configuration, the fairing 520 is divided into two sections, each covering one half of the payload compartment and joined together lengthwise, such that each section of the fairing 520 extends the full length of the payload compartment. The fairing 520 may also be formed of more than two sections or be in a different configuration, such as sections around the diameter of the payload compartment or multiple smaller segments which separate and move away.

FIG. 9 depicts the satellite dispenser 500 of FIG. 8 after the fairing 520 of the launch vehicle releases to expose the satellite dispenser to the exterior of the launch vehicle, according to at least one example. In FIG. 9, upon reaching, or prior to reaching, the altitude at which the satellites are to be deployed, the fairing 520 is released from the payload compartment to expose the outer dispenser 508, the inner dispenser 506, the first satellites 512, and the second satellites 514. The fairing 520 can have clamshell configuration and release into two pieces that move away from the second stage 502, exposing the payload compartment in the process. After the fairing 520 is released from the second stage 502, the first satellites 512 are exposed and on the outermost perimeter of the outer dispenser 508, ready to launch.

Figure 10:
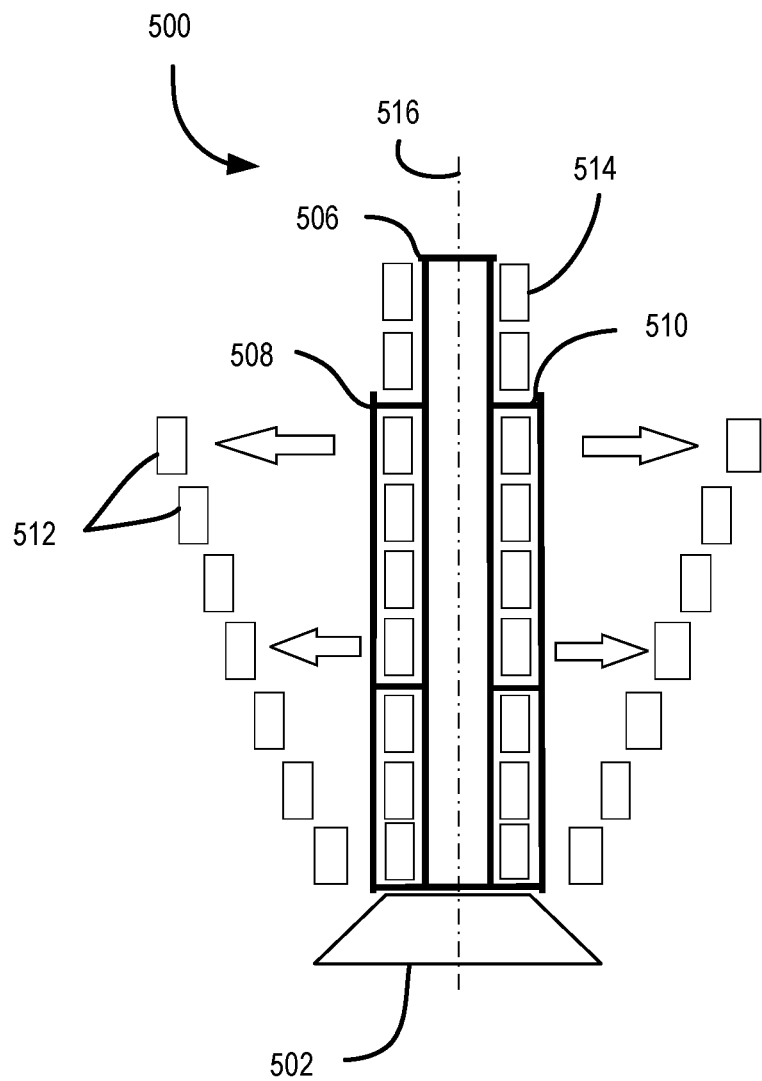
FIG. 10 depicts the satellite dispenser of FIG. 6 as an exterior set of satellites release from the outer dispenser, according to at least one example.
Figure 16:
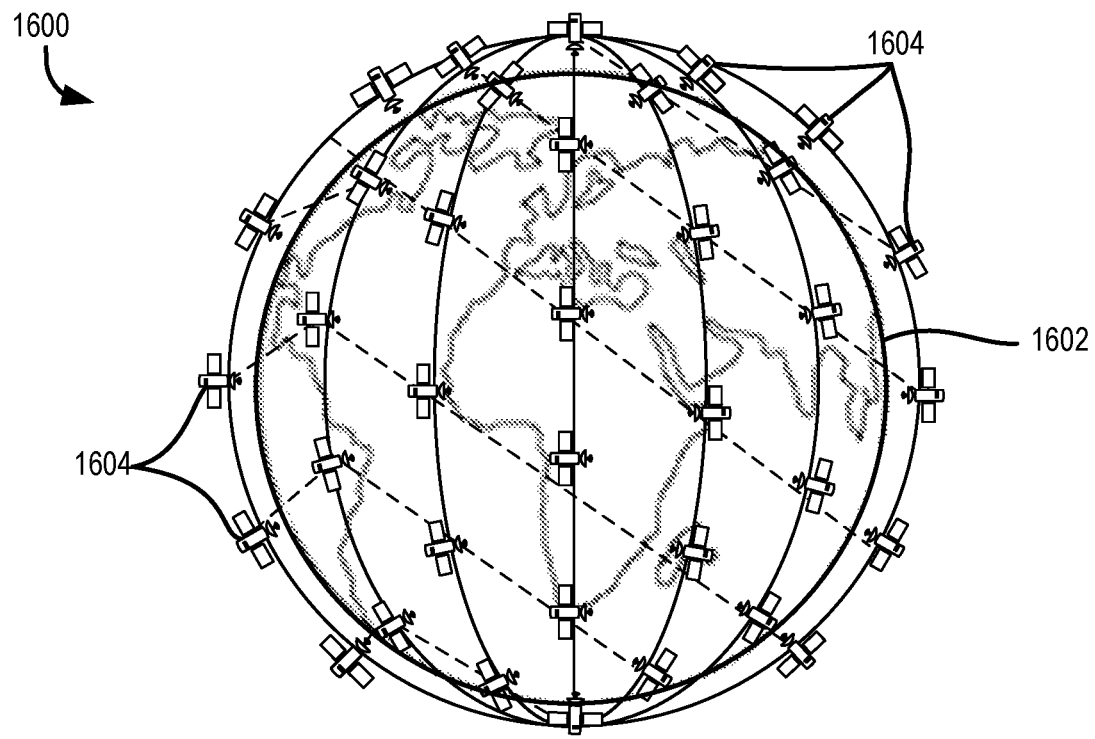
FIG. 16 depicts an example satellite constellation in LEO, according to at least one example.

FIG. 10 depicts the satellite dispenser 500 of FIG. 8 as the first satellites 512 release from the outer dispenser 508, according to at least one example. After the fairing 520 has been released and moved away from the second stage 502, the first satellites 512, which are arranged around the perimeter of the outer dispenser 508, are released. The first satellites 512 may be released by a hold and release mechanism including a spring and latch or pin with pin-puller. Actions may be performed by a computing device or control system located within the second stage 502. For example, the control system may determine the altitude of the launch vehicle and convey signals to perform various actions to actuators or other elements based on the altitude. An example of such a control system is shown and described with respect to FIG. 17. When the latch or pin-puller is activated by the control system, the spring of each hold and release mechanism launches the first satellites 512 into LEO. Propulsion systems that may be incorporated into the first satellites 512 may then be used to navigate the first satellites 512 into the satellite constellation as shown in FIG. 16. After the first satellites 512 are launched, the outer dispenser 508 is exposed and outermost on the second stage 502, with the second satellites behind or within the outer dispenser 508. In some examples, the control system may send a signal to a thrust device connected to the satellite and cause it to launch or disconnect from the dispenser based on the force provided by the thrust device.

Figure 11:
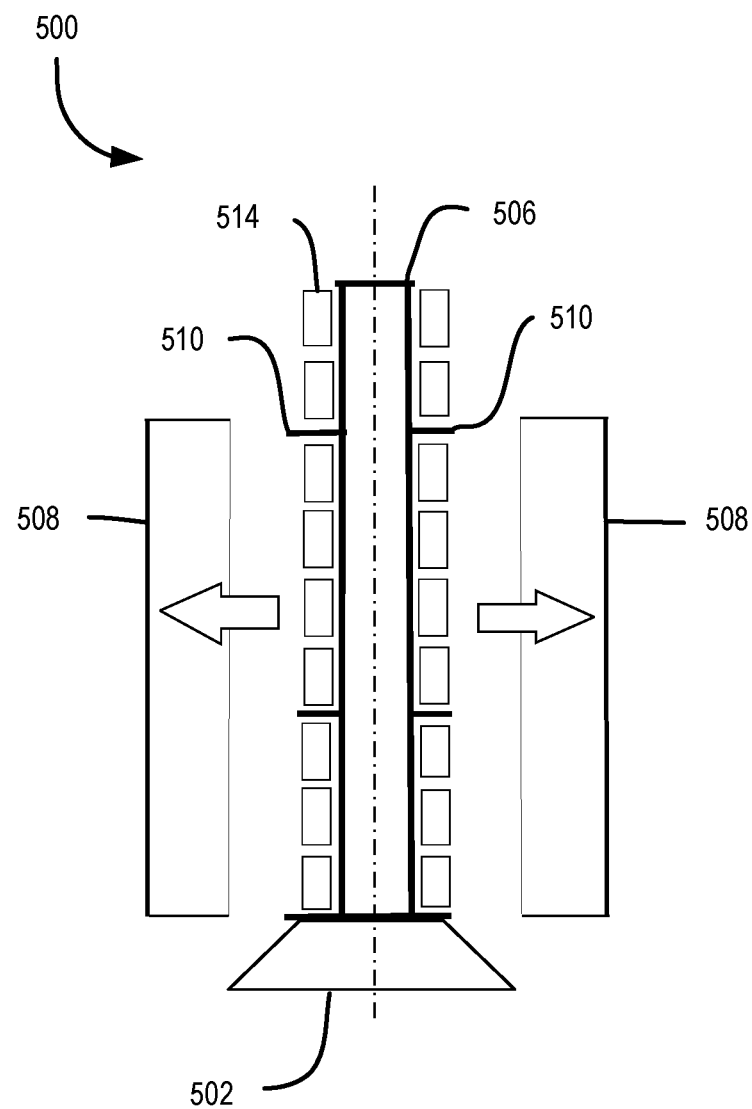
FIG. 11 depicts the satellite dispenser of FIG. 6 as the outer dispenser releases from the satellite dispenser, exposing the interior set of satellites for launching, according to at least one example.

FIG. 11 depicts the satellite dispenser 500 of FIG. 8 as the outer dispenser 508 releases from the inner dispenser 506, exposing the second satellites 514 for launching, according to at least one example. The outer dispenser 508 is released by releasing the struts 510 which connect the outer dispenser 508 to the inner dispenser 506. Additional connections between the outer dispenser 508 and the second stage 502 may be released as well, allowing the outer dispenser 508 to move away and clear the launch path of the second satellites 514. The outer dispenser 508 may be in two or more pieces and may move away in a clamshell configuration similar to the fairing 520. The outer dispenser 508 may also move away in other configurations, such as with three, four, five, or more segments releasing to move away. The struts 510 connecting the outer dispenser 508 to the inner dispenser 506 may be equipped with release devices similar to those of the fairings 520 or the first satellites 512 to ensure it is released and cleared away from the second stage 502 before launching second satellites 514.

The outer dispenser 508 may be tethered to the second stage 502 and therefore only move away to the extent that the tether allows. For example, the tether may keep the outer dispenser 508 with the second stage 502 but allow the outer dispenser 508 to trail behind the second stage 502 clear of the path of the second satellites 514 as they launch.

Figure 12:
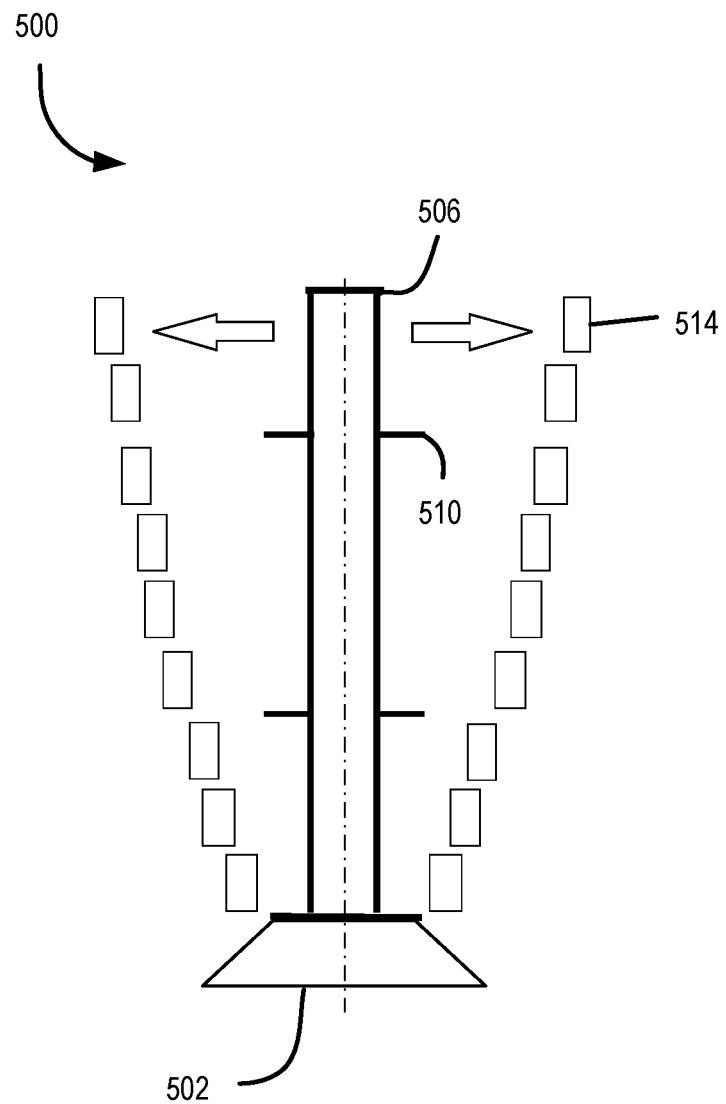
FIG. 12 depicts the satellite dispenser of FIG. 6 as the interior set of satellites release from the inner dispenser, according to at least one example.

FIG. 12 depicts the satellite dispenser 500 of FIG. 8 as the second satellites 514 release from the inner dispenser 506, according to at least one example. With the outer dispenser 508 clear of the launch path, the second satellites 514 are released in the same manner as the first satellites 512, such as with a hold down and release mechanism or other such launch mechanism for satellites known in the art. These second satellites 514 are dispensed in a similar manner to the first satellites 512 released as described above. The first satellites 512 and the second satellites 514 may be released from the inner dispenser 506 and the outer dispenser 508 as quickly as possible, for example, with only enough time between release of the first satellites 512, the outer dispenser 508, and the second satellites 514 for the previously released items to clear the immediate area obstructing the next item to launch.

In some examples, the first satellites 512 and the second satellites 514 may be released with a time delay between each, to ensure greater dispensing and coverage of the satellites over a particular area. For example in the case of satellites to be spread into a constellation covering a large area, delaying the release of the second satellites 514 may ensure that the first satellites 512 and the second satellites 514 cover a larger area without the need to consume additional satellite resources in positioning the satellites in the constellation.

Furthermore, the first satellites 512 and the second satellites 514 may be released in stages. For example, the first satellites 512 may be released in three stages or waves, with a first group of the first satellites 512 released first, a second group of the first satellites 512 released second, and a third group of the first satellites 512 released third before releasing the outer dispenser 508.

The first satellites 512 and the second satellites 514 may be released starting from the tip or end of the second stage 502 first, with the satellites located nearest to the tip of the second stage 502 released before subsequent satellites. In some examples, the first satellites 512 and the second satellites 514 may each release the entire group of satellites at the same time.

In some examples, such as the case of a satellite dispenser 114 with only the inner dispenser 506 but no outer dispenser 508, FIG. 12 depicts the launch process for the second satellites 514 after the fairing 520 is released. In these examples, the modular dispenser rings 200 may be used to form the inner dispenser 506 but there may not necessarily be an outer dispenser 508.

Figure 13:
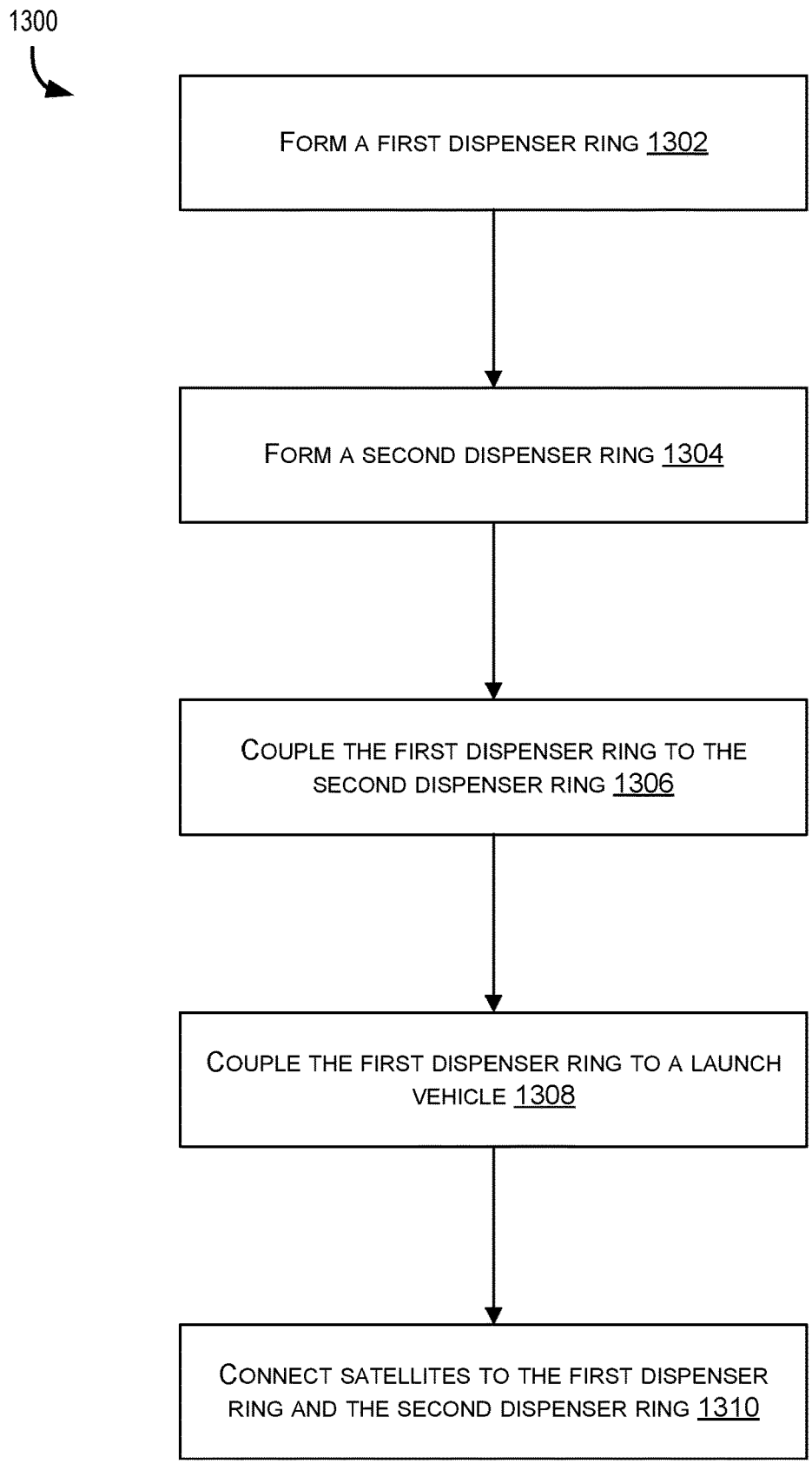
FIG. 13 is an example flow chart depicting a method for forming a satellite dispenser of modular dispenser rings, according to at least one example.
Figure 14:
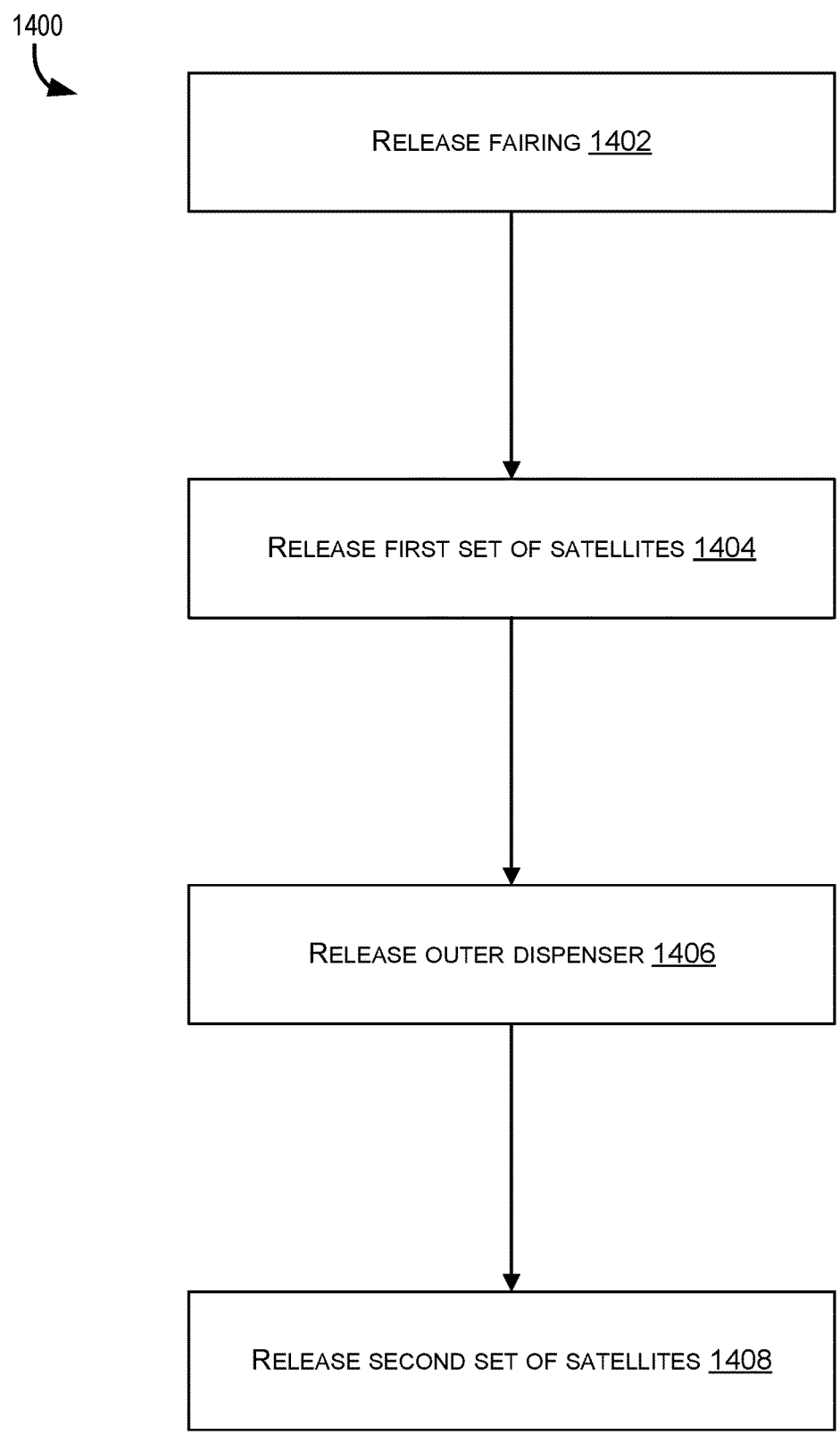
FIG. 14 is an example flow chart depicting a method for releasing satellites from a satellite dispenser, according to at least one example.

FIGS. 13 through 14 illustrate examples of flows for forming a satellite dispenser and releasing satellites from a satellite dispenser, respectively, according to embodiments of the present disclosure. The satellite dispenser can be any of the satellite dispensers described herein above in connection with FIGS. 1 through 12.

FIG. 13 is an example flow chart depicting a flow 1300 for forming a satellite dispenser of modular dispenser rings, according to at least one example. The flow 1300 may be used to form the modular dispenser ring 200 as well as a satellite dispenser 114 composed of multiple modular dispenser rings 200.

In an example, the flow 1300 includes operation 1302, where a first dispenser ring is formed. The first dispenser ring may be a modular dispenser ring 200 as described above with respect to FIG. 2. Forming the first dispenser ring under operation 1302 may include a number of other processes or sub-operations for forming the first dispenser ring. In one example a first inner circular ring and a second inner circular ring are formed, corresponding to the first inner circular ring 212 and the second inner circular ring 214 of FIG. 2. The first inner circular ring and the second inner circular ring may be formed by deforming a metallic band into a ring-shape, forming a carbon fiber ring, machining a ring from a monolithic piece of metal, or deforming a metal sheet with a press or die.

A next sub-operation of operation 1302 includes forming a number of vertical stanchions. The vertical stanchions may be similar to the vertical stanchions 204 of FIG. 2 and may be formed of support beams or structures such as "I" beams, tubular supports, solid supports, or other such support structures and forming the vertical stanchions may include cutting or machining a stock metal beam to the proper length. In some examples, forming the vertical stanchions may include forming a carbon-fiber tube or beam-structure of the proper length. The vertical stanchions are further formed by connecting securing devices to each end of the stanchion. In at least one example the securing devices may include a plate with holes therein that is formed and welded to a metallic stanchion. In some examples the securing device may include a latch or other attachment device that is secured to the vertical stanchion. In some examples the securing device may be formed integrally with the vertical stanchion, such as when formed of carbon fiber.

A next sub-operation of operation 1302 includes forming truss structures and coupling the truss structures to the vertical stanchions. The truss structures may be formed by welding, coupling, integrally forming together, or otherwise generating struts in a truss configuration such as described above with respect to FIG. 2. The truss structure is then joined to the vertical stanchion permanently by welding or otherwise permanently affixing them together. In some examples, the truss structures may be omitted. Additional sub-operations may likewise be performed, such as forming struts to connect adjacent vertical stanchions and provide strength and rigidity as well as resistance against twisting, racking, or buckling. The struts may be formed of metal and welded or otherwise similarly coupled to the vertical stanchions.

A next sub-operation of operation 1302 includes forming a first external ring and a second external ring. The first external ring and the second external ring may be similar to the first external ring 216 and the second external ring 218 of FIG. 2 and may be formed in the same manner as the first circular ring and the second circular ring described above. The first external ring and the second external ring are further formed by connecting satellite attachments around the perimeter of each. Each satellite attachment including a hold and release mechanism and permanently affixed to the first external ring and the second external ring.

A next sub-operation of operation 1302 includes affixing the vertical stanchions around the perimeter of the first circular ring and the second circular ring, such that the first circular ring and the second circular ring are perpendicular to the vertical stanchions and the vertical stanchions are parallel to a central axis passing through the center of each of the first circular ring and the second circular ring. The first external ring and the second external ring are then affixed to the truss structures, concentric with the first circular ring and the second circular ring.

In an example, the flow 1300 includes operation 1304, where a second dispenser ring, such as the modular dispenser ring 200 of FIG. 2 is formed. The second dispenser ring may be formed in substantially the same manner as the first dispenser ring described above. In particular, it may include sub-operations such as the following.

In a sub-operation of operation 1302, a first inner circular ring and a second inner circular ring are formed, corresponding to the first inner circular ring 212 and the second inner circular ring 214 of FIG. 2. The first inner circular ring and the second inner circular ring may be formed by deforming a metallic band into a ring-shape, forming a carbon fiber ring, machining a ring from a monolithic piece of metal, or deforming a metal sheet with a press or die.

A next sub-operation of operation 1304 includes forming a number of vertical stanchions. The vertical stanchions may be formed of support beams or structures such as "I" beams, tubular supports, solid supports, or other such support structures and forming the vertical stanchions may include cutting or machining a stock metal beam to the proper length. In some examples, forming the vertical stanchions may include forming a carbon-fiber tube or beam-structure of the proper length. The vertical stanchions are further formed by connecting securing devices to each end of the stanchion. In at least one example the securing devices may include a plate with holes therein that is formed and welded to a metallic stanchion. In some examples the securing device may include a latch or other attachment device that is secured to the vertical stanchion. In some examples the securing device may be formed integrally with the vertical stanchion, such as when formed of carbon fiber.

A next sub-operation of operation 1304 includes forming truss structures and coupling the truss structures to the vertical stanchions. The truss structures may be formed by welding, coupling, integrally forming together, or otherwise generating struts in a truss configuration such as described above with respect to FIG. 2. The truss structure is then joined to the vertical stanchion permanently by welding or otherwise permanently affixing them together.

A next sub-operation of operation 1304 includes forming a first external ring and a second external ring. The first external ring and the second external ring are formed in the same manner as the first circular ring and the second circular ring described above. The first external ring and the second external ring are further formed by connecting satellite attachments around the perimeter of each. Each satellite attachment including a hold and release mechanism and permanently affixed to the first external ring and the second external ring.

A next sub-operation of operation 1304 includes affixing the vertical stanchions around the perimeter of the first circular ring and the second circular ring, such that the first circular ring and the second circular ring are perpendicular to the vertical stanchions and the vertical stanchions are parallel to a central axis passing through the center of each of the first circular ring and the second circular ring. The first external ring and the second external ring are then affixed to the truss structures, concentric with the first circular ring and the second circular ring.

In an example, the flow 1300 includes operation 1306, where the first dispenser ring is coupled to the second dispenser ring. The first dispenser ring may be coupled to the second dispenser ring at the securing devices by permanently affixing them, such as by welding or through removable means such as bolts or other such semi-permanent fixtures.

In an example, the flow 1300 includes operation 1308, where the first dispenser ring is coupled to a launch vehicle. In particular, the first dispenser ring is coupled to a second stage of a launch vehicle, to the payload adapter, as described above. The first dispenser ring and the second dispenser ring form a tower on the payload adapter ready to receive satellites for launch.

In an example, the flow 1300 includes operation 1310, where satellites are connected to the first dispenser ring and the second dispenser ring. The satellites are connected to the satellites attachments of the first dispenser ring and the second dispenser ring. The satellites may be pre-loaded onto hold and release devices such that a spring launches the satellites away from the satellite dispenser when the satellite attachment is released.

FIG. 14 is an example flow chart depicting a flow 1400 for releasing satellites from a satellite dispenser, according to at least one example. The flow 1400 may be incorporated when launching satellites from a concentric satellite dispenser 500 as described above. The flow 1400 may define a control sequence for launching satellites from a launch vehicle.

In an example, the flow 1400 includes operation 1402, where an outer fairing of the second stage of the launch vehicle is released. The outer fairing covers the satellites and dispenser during launch and when released exposes the satellites and allows them to be launched for use.

In an example, the flow 1400 includes operation 1404, where a first set of satellites are launched from the dispenser. The first set of satellites may be connected to an outer dispenser as described above. In some examples the first set of satellites may include some satellites connected to an inner dispenser. The first set of satellites may be launched all at once or may be launched sequentially or with a time delay between subsequent launches to provide greater spatial coverage for the released satellites. Releasing the first set of satellites may include multiple sub-operations as well. For example, a first sub-operation may include releasing a hold or clamp on the first set of satellites. A second sub-operation may include launching the first set of satellites away from the dispenser. In some examples the first sub-operation and the second sub-operation may be performed simultaneously, such as with a hold down and release mechanism.

In some examples, such as examples including a single satellite dispenser rather than a concentric satellite dispenser, the flow may be complete after releasing the first set of satellites. In particular, the flow 1400 may include operation 1402, where the fairing is released from the second stage and subsequently include operation 1404, where the first satellites are released from the satellite dispenser.

In an example, the flow 1400 includes operation 1406, where the outer dispenser is released. The outer dispenser is released from connection with the inner dispenser and allowed to move away from the second stage. The outer dispenser may be released in sections or pieces, such as with a clamshell design or into four or more segments that move away. Releasing the outer dispenser may also include securing the released outer dispenser to the second stage with a tether. Releasing the outer dispenser may include multiple sub-operations as well. For example, a first sub-operation may include releasing a hold or clamp on the sections of the outer dispenser. A second sub-operation may include launching the outer dispenser away from the inner dispenser. In some examples the first sub-operation and the second sub-operation may be performed simultaneously, such as with a hold down and release mechanism.

In an example, the flow 1400 includes operation 1408, where the second set of satellites are released. The second satellites may be released upon reaching a particular location or altitude, as may the first satellites. The second satellites may be connected to the inner dispenser. The second satellites may be launched all at once or may be launched sequentially or with a time delay between subsequent launches to provide greater spatial coverage for the released satellites. Releasing the second satellites may include multiple sub-operations as well. For example, a first sub-operation may include releasing a hold or clamp on the second satellites. A second sub-operation may include launching the second satellites away from the inner dispenser. In some examples the first sub-operation and the second sub-operation may be performed simultaneously, such as with a hold down and release mechanism.

FIG. 15 depicts a launch sequence 1500 for launching satellites into orbit, according to at least one example. In the launch sequence 1500, a launch vehicle 1502 takes off from a launch zone 1504 including a launch tower and launch pad. The launch vehicle 1502 ascends through the atmosphere until it reaches the stage separation altitude. The stage separation altitude may vary based on the purpose of the launch vehicle and the payload carried by the launch vehicle 1502.

At the stage separation altitude, the launch vehicle 1502 separates into a first stage 1506 and a second stage 1508. The first stage 1506 may include rockets or other such propulsion devices for liftoff and climbing to the separation altitude. The first stage 1506 may then return to the surface of the Earth in a controlled or uncontrolled descent.

The second stage 1508 may include propelling devices, such as further rockets or other devices, to reach altitudes beyond the stage separation altitude. The second stage 1508 contains the payload 1512 within a fairing 1510 that protects the payload 1512 during launch. At or near the payload separation altitude, the fairing 1510 covering the payload 1512 releases from the second stage 1508. The fairing 1510 may be in a clamshell configuration which moves away in two pieces or may come apart off the second stage 1508 in more than two pieces or in configurations other than a clamshell such as in segments or sections.

After the fairing 1510 separates from the second stage 1508, the payload 1512 launches or separates from the second stage 1508 at the desired altitude. For example, for satellites to be deployed for LEO, the payload 1512 (e.g., satellite(s)) may be released from the second stage 1508 at an altitude of up to 2,000 km (1,200 mi.) above the surface of the Earth. The payload 1512 may include a single satellite or a number of satellites intended to be distributed throughout LEO to cover or substantially cover the surface of the Earth in a satellite constellation.

FIG. 16 depicts an example satellite constellation 1600 in LEO, according to at least one example. A satellite constellation 1600 includes a number of satellites 1604 working in concert. The satellites 1604 may have coordinated ground coverage and operate together under a shared control to ensure complete coverage and overlaps in coverage. The satellites 1604 may all be at the same or nearly the same altitude over the Earth 1602. The satellites 1604 may be released from a single launch vehicle 1502, with the plurality of satellites 1604 contained within the fairing 1510 and released at LEO. The satellites 1604 may then be navigated or directed to their orbital locations in LEO from the release point from the second stage 1508.

Figure 17:
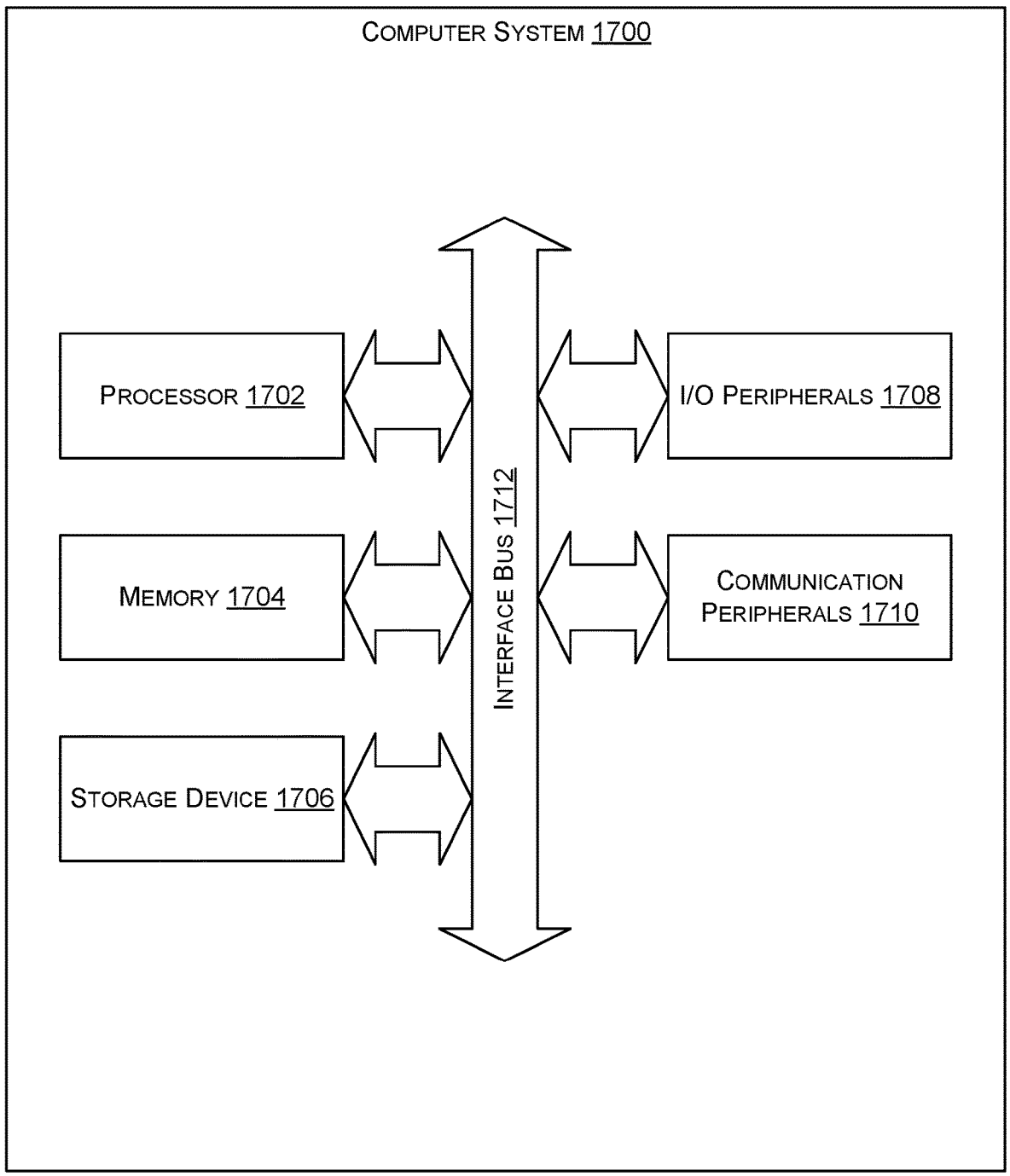
FIG. 17 illustrates an example of components of a computer system for performing methods described herein, according to at least one example.

FIG. 17 illustrates an example of components of a computer system 17001700 that can belong to a second stage of a launch vehicle or a manufacturing facility (e.g., for sending manufacturing instructions), according to embodiments of the present disclosure. The computer system 1700 can be implemented as a subsystem of a control system of the second stage. Although the components of the computer system 1700 are illustrated as belonging to a same computer system 1700, the computer system 1700 can also be distributed (e.g., between multiple subsystems of the second stage of the launch vehicle or between subsystems of a manufacturing facility).

The computer system 1700 includes at least a processor 1702, a memory 1704, a storage device 1706, input/output peripherals (I/O) 1708, communication peripherals 1710, and an interface bus 1712. The interface bus 1712 is configured to communicate, transmit, and transfer data, controls, and commands among the various components of the computer system 1700. The memory 1704 and the storage device 1706 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1704 and the storage device 1706 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1700.

Further, the memory 1704 includes an operating system, programs, and applications. The processor 1702 is configured to execute the stored instructions and includes, for example, a logical processing unit, a microprocessor, a digital signal processor, and other processors. The memory 1704 and/or the processor 1702 can be virtualized and can be hosted within another computer system of, for example, a cloud network or a data center. The I/O peripherals 1708 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1708 are connected to the processor 1702 through any of the ports coupled to the interface bus 1712. The communication peripherals 1710 are configured to facilitate communication between the computer system 1700 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A modular satellite dispenser system, comprising:
a first dispenser ring; and
a second dispenser ring, wherein a first side of the first dispenser ring is connected to the second dispenser ring and a second, opposite side of the first dispenser ring is connected to a payload adapter of a second stage of a launch vehicle with a center axis of the first dispenser ring aligned with a center axis of the launch vehicle,
wherein the first dispenser ring comprises:
a plurality of vertical stanchions oriented parallel to a central axis of the first dispenser ring;

an interface at an end of a vertical stanchion of the plurality of vertical stanchions and connected to the second dispenser ring;

a first circular ring with the plurality of vertical stanchions connected at a perimeter of the first circular ring;

a truss structure coupled to the vertical stanchion extending radially away from the first circular ring; and a second circular ring concentric with the first circular ring, the plurality of vertical stanchions connected at a perimeter of the second circular ring, wherein the first circular ring, the second circular ring, and the plurality of vertical stanchions define a plurality of retention areas, wherein a retention area of the plurality of retention areas is configured to retain a portion of a satellite.

2. The modular satellite dispenser system of claim 1, wherein:

the first dispenser ring further comprises a first securing device connected to at least one of the plurality of vertical stanchions at the first side of the first dispenser ring, and wherein the first side of the first dispenser ring comprises the first securing device connected to a second securing device of the second dispenser ring.

3. The modular satellite dispenser system of claim 1, wherein:

the plurality of vertical stanchions, the first circular ring, and the second circular ring define a plurality of interface planes around the perimeter of the first dispenser ring; and the plurality of interface planes each defines a plane through which an extending satellite portion protrudes to occupy an inner volume of the first dispenser ring.

4. A satellite dispenser system, comprising:

a circular ring;

a first vertical stanchion having a first coupleable interface to a second satellite dispenser system, wherein the first coupleable interface is at an end of the first vertical stanchion, wherein the first vertical stanchion is coupled to a perimeter of the circular ring and perpendicular to a plane of the circular ring;

a second vertical stanchion coupled to the perimeter of the circular ring and perpendicular to the plane of the circular ring;

a retention area configured to retain at least a portion of a satellite, the retention area defined in part by the circular ring, the first vertical stanchion, and the second vertical stanchion; and a truss structure coupled to the first vertical stanchion extending radially away from the circular ring.

5. The satellite dispenser system of claim 4, wherein the circular ring, the first vertical stanchion, and the second vertical stanchion form a first dispenser ring, wherein the satellite dispenser system further comprises a second dispenser ring, and wherein the first dispenser ring and the second dispenser ring are formed of different materials.

6. The satellite dispenser system of claim 4, further comprising:

a satellite attachment interface at a distal end of the truss structure, wherein the satellite attachment interface comprises an adapter ring perpendicular to a central axis of the satellite dispenser system and a securing device to couple the adapter ring to an adjacent adapter ring.

7. A method, comprising:

forming a first dispenser ring, the first dispenser ring comprising:

a circular ring; and a vertical stanchion having a first coupleable interface at a first end of the vertical stanchion and a second coupleable interface at a second end of the vertical stanchion, wherein:

the vertical stanchion is coupled to a perimeter of the circular ring and perpendicular to a plane of the circular ring;

the first coupleable interface coupled to an adjacent coupleable interface of an adjacent satellite dispenser ring;

a retention area configured to retain at least a portion of a satellite, the retention area defined in part by the circular ring and the vertical stanchion; and a truss structure coupled to the vertical stanchion extending radially away from the circular ring.

8. The method of claim 7, further comprising:

forming a second dispenser ring; and coupling the second dispenser ring to the first dispenser ring.

9. The method of claim 8, further comprising coupling the first dispenser ring to a payload adapter of a launch vehicle.

10. The method of claim 9, wherein coupling the first dispenser ring to the second dispenser ring comprises coupling the vertical stanchion of the first dispenser ring to a vertical stanchion of the second dispenser ring.

11. The method of claim 10, wherein coupling the first dispenser ring to the second dispenser ring comprises coupling a first adapter ring connected to the vertical stanchion of the first dispenser ring, the first adapter ring perpendicular to a central axis of the first dispenser ring, to a second adapter ring connected to a vertical stanchion of the second dispenser ring, the second adapter ring perpendicular to a central axis of the second dispenser ring.

12. The method of claim 10, wherein coupling the first dispenser ring to the second dispenser ring comprises coupling a first locking mechanism connected to the vertical stanchion of the first dispenser ring to a second locking mechanism connected to the vertical stanchion of the second dispenser ring.

13. The satellite dispenser system of claim 4, wherein the retention area is defined in part by an assembly that includes the circular ring, the first vertical stanchion, the first coupleable interface, and the second vertical stanchion, and wherein the assembly and the first coupleable interface are separate from the satellite.

14. The satellite dispenser system of claim 13, further comprising:

a satellite attachment interface at a distal end of the truss structure, wherein the satellite attachment interface comprises an adapter ring perpendicular to a central axis of the satellite dispenser system and a securing device to couple the adapter ring to an adjacent adapter ring.

15. The satellite dispenser system of claim 4, wherein the retention area is located at least partially outside of an outer perimeter of the circular ring.

16. The satellite dispenser system of claim 15, wherein the retention area has an inner wall that is outside the outside perimeter of the circular ring.

17. The satellite dispenser system of claim 4, wherein the first coupleable interface is configured to releasably couple the first vertical stanchion to a corresponding vertical stanchion of the second satellite dispenser system.

18. The satellite dispenser system of claim 4, wherein the retention area comprises a satellite interface coupleable to the satellite, wherein a volume between the satellite interface and the first vertical stanchion, the second vertical stanchion, and the circular ring is configured to receive the portion of the satellite.

19. The satellite dispenser system of claim 4, wherein the retention area comprises a satellite interface coupleable to the satellite, wherein the satellite interface is positioned away from the first vertical stanchion, the second vertical stanchion, and the circular ring.

20. The satellite dispenser system of claim 4, wherein the truss structure includes a first truss, and wherein:
- the first vertical stanchion comprises the first truss; and
- the second vertical stanchion comprises a second truss extending radially away from the center of the circular ring and the first truss and the second truss define the retention area.

* * * * *